(12) United States Patent
Tang et al.

(10) Patent No.: US 9,448,388 B2
(45) Date of Patent: Sep. 20, 2016

(54) OPTICAL IMAGE CAPTURING SYSTEM

(71) Applicant: ABILITY OPTO-ELECTRONICS TECHNOLOGY CO., LTD., Taichung (TW)

(72) Inventors: Nai-Yuan Tang, Taichung (TW); Yeong-Ming Chang, Taichung (TW)

(73) Assignee: ABILITY OPTO-ELECTRONICS TECHNOLOGY CO., LTD., Taichung (TW)

(*) Notice: Subject to any disclaimer, the term of this patent is extended or adjusted under 35 U.S.C. 154(b) by 0 days.

(21) Appl. No.: 14/856,101

(22) Filed: Sep. 16, 2015

(65) Prior Publication Data
US 2016/0231535 A1 Aug. 11, 2016

(30) Foreign Application Priority Data
Feb. 6, 2015 (TW) .............................. 104104072 A

(51) Int. Cl.
*G02B 9/60* (2006.01)
*G02B 13/00* (2006.01)
*G02B 27/00* (2006.01)

(52) U.S. Cl.
CPC ............. *G02B 13/0045* (2013.01); *G02B 9/60* (2013.01); *G02B 27/0025* (2013.01)

(58) Field of Classification Search
CPC . G02B 13/0045; G02B 9/60; G02B 27/0025
See application file for complete search history.

(56) References Cited

U.S. PATENT DOCUMENTS

2014/0063596 A1* 3/2014 Jung .................. G02B 13/0045
359/357

* cited by examiner

*Primary Examiner* — Joseph P Martinez
(74) *Attorney, Agent, or Firm* — Ming Chow; Sinorica, LLC

(57) ABSTRACT

A five-piece optical lens for capturing image and a five-piece optical module for capturing image, along the optical axis in order from an object side to an image side, include a first lens with positive refractive power having a convex object-side surface; a second lens with refractive power; a third lens with refractive power; a fourth lens with refractive power; and a fifth lens with negative refractive power; and at least one of the image-side surface and object-side surface of each of the five lens elements are aspheric. The optical lens can increase aperture value and improve the imagining quality for use in compact cameras.

25 Claims, 14 Drawing Sheets

OPTICAL IMAGE CAPTURING SYSTEM

The current application claims a foreign priority to application number 104104072 filed on Feb. 6, 2015 in Taiwan.

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system towards the field of high pixels. Therefore, the requirement for high imaging quality is rapidly raised.

The conventional optical system of the portable electronic device usually has a three or four-piece lens. However, the optical system is asked to take pictures in a dark environment, in other words, the optical system is asked to have a large aperture. An optical system with large aperture usually has several problems, such as large aberration, poor image quality at periphery of the image, and hard to manufacture. In addition, an optical system of wide-angle usually has large distortion. Therefore, the conventional optical system provides high optical performance as required.

It is an important issue to increase the quantity of light entering the lens and the angle of field of the lens. In addition, the modern lens is also asked to have several characters, including high pixels, high image quality, small in size, and high optical performance.

BRIEF SUMMARY OF THE INVENTION

The aspect of embodiment of the present disclosure directs to an optical image capturing system and an optical image capturing lens which use combination of refractive powers, convex and concave surfaces of five-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens element:

A height for image formation of the optical image capturing system is denoted by HOI. A height of the optical image capturing system is denoted by HOS. A distance from the object-side surface of the first lens element to the image-side surface of the fifth lens element is denoted by InTL. A distance from the image-side surface of the fifth lens to the image plane is denoted by InB. InTL+InB=HOS. A distance from the first lens element to the second lens element is denoted by IN12 (instance). A central thickness of the first lens element of the optical image capturing system on the optical axis is denoted by TP1 (instance).

The lens parameter related to a material in the lens:

An Abbe number of the first lens element in the optical image capturing system is denoted by NA1 (instance). A refractive index of the first lens element is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens

An entrance pupil diameter of the optical image capturing system is denoted by HEP.

The lens parameter related to a depth of the lens shape

A distance in parallel with an optical axis from a maximum effective semi diameter position to an axial point on the object-side surface of the fifth lens is denoted by InRS51 (instance). A distance in parallel with an optical axis from a maximum effective semi diameter position to an axial point on the image-side surface of the fifth lens is denoted by InRS52 (instance).

The lens parameter related to the lens shape:

A critical point C is a tangent point on a surface of a specific lens, and the tangent point is tangent to a plane perpendicular to the optical axis and the tangent point cannot be a crossover point on the optical axis. To follow the past, a distance perpendicular to the optical axis between a critical point C41 on the object-side surface of the fourth lens and the optical axis is HVT41 (instance). A distance perpendicular to the optical axis between a critical point C51 on the object-side surface of the fifth lens and the optical axis is HVT51 (instance). A distance perpendicular to the optical axis between a critical point C52 on the image-side surface of the fifth lens and the optical axis is HVT52 (instance). The object-side surface of the fifth lens has one inflection point IF511 which is nearest to the optical axis, and the sinkage value of the inflection point IF511 is denoted by SGI511. A distance perpendicular to the optical axis between the inflection point IF511 and the optical axis is HIF511 (instance). The image-side surface of the fifth lens has one inflection point IF521 which is nearest to the optical axis, and the sinkage value of the inflection point IF521 is denoted by SGI521 (instance). A distance perpendicular to the optical axis between the inflection point IF521 and the optical axis is HIF521 (instance). The object-side surface of the fifth lens has one inflection point IF512 which is the second nearest to the optical axis, and the sinkage value of the inflection point IF512 is denoted by SGI512 (instance). A distance perpendicular to the optical axis between the inflection point IF512 and the optical axis is HIF512 (instance). The image-side surface of the fifth lens has one inflection point IF522 which is the second nearest to the optical axis, and the sinkage value of the inflection point IF522 is denoted by SGI522 (instance). A distance perpendicular to the optical axis between the inflection point IF522 and the optical axis is HIF522 (instance).

The lens element parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

The present invention provides an optical image capturing system, in which the fifth lens is provided with an inflection point at the object-side surface or at the image-side surface to adjust the incident angle of each view field and modify the ODT and the TDT. In addition, the surfaces of the fifth lens are capable of modifying the optical path to improve the imagining quality.

The optical image capturing system of the present invention includes a first lens, a second lens, a third lens, a fourth lens, and a fifth lens in order along an optical axis from an object side to an image side. These five lenses have refractive power. Both the object-side surface and the image-side surface of the fifth lens are aspheric surfaces. The optical image capturing system satisfies:

$1.2 \leq f/HEP \leq 6.0$ and $0.5 \leq HOS/f \leq 5.0$;

where f is a focal length of the optical image capturing system; HEP is an entrance pupil diameter of the optical image capturing system; HOS is a distance in parallel with the optical axis from an object-side surface of the first lens to the image plane.

The present invention further provides an optical image capturing system, including a first lens, a second lens, a third lens, a fourth lens, and a fifth lens in order along an optical axis from an object side to an image side. The first lens has refractive power. The second lens has refractive power, and the third and the fourth lenses have refractive power. The fifth lens has negative refractive power, and both an object-side surface and an image-side surface thereof are aspheric surfaces. The optical image capturing system satisfies:

$1.2 \leq f/HEP \leq 6.0$; $0.4 \leq |\tan(HAF)| \leq 3.0$; $0.5 \leq HOS/f \leq 5.0$; $|TDT| < 60\%$; and $|ODT| \leq 50\%$;

where f is a focal length of the optical image capturing system; HEP is an entrance pupil diameter of the optical image capturing system; HOS is a distance in parallel with the optical axis between an object-side surface, which face the object side, of the first lens and the image plane; HAF is a half of the view angle of the optical image capturing system; TDT is a TV distortion; ODT is an optical distortion.

The present invention further provides an optical image capturing system, including a first lens, a second lens, a third lens, a fourth lens, and a fifth lens in order along an optical axis from an object side to an image side. At least two of these five lenses each has at least an inflection point on at least a surface thereof. The first lens has positive refractive power, and both an object-side surface and an image-side surface thereof are aspheric surfaces. The second and the third lens have refractive power, and the fourth lens has positive refractive power. The fifth lens has negative refractive power, and both an object-side surface and an image-side surface thereof are aspheric surfaces. The optical image capturing system satisfies:

$1.2 \leq f/HEP \leq 3.0$; $0.4 \leq |\tan(HAF)| \leq 3.0$; $0.5 \leq HOS/f \leq 3.0$; $|TDT| < 60\%$; and $|ODT| \leq 50\%$;

where f is a focal length of the optical image capturing system; HEP is an entrance pupil diameter of the optical image capturing system; HOS is a distance in parallel with the optical axis between an object-side surface, which face the object side, of the first lens and the image plane; HAF is a half of the view angle of the optical image capturing system; TDT is a TV distortion; ODT is an optical distortion.

In an embodiment, the optical image capturing system further includes an image sensor with a size less than 1/1.2" in diagonal, and the preferred size is 1/2.3", and a pixel less than 1.4 µm. A preferable pixel size of the image sensor is less than 1.2 µm, and more preferable pixel size is less than 0.9 µm. A 16:9 image sensor is available for the optical image capturing system of the present invention.

In an embodiment, the optical image capturing system of the present invention is available to high-quality (4K 2K, so called UHD and QHD) recording, and provides high quality of image.

In an embodiment, a height of the optical image capturing system (HOS) can be reduced while $|f1|>f5$.

In an embodiment, when the lenses satisfy $|f2|+|f3|+|f4|>|f1|+|f5|$, at least one of the lenses from the second lens to the fourth lens could have weak positive refractive power or weak negative refractive power. The weak refractive power indicates that an absolute value of the focal length is greater than 10. When at least one of the lenses from the second lens to the fourth lens could have weak positive refractive power, it may share the positive refractive power of the first lens, and on the contrary, when at least one of the lenses from the second lens to the fourth lens could have weak negative refractive power, it may finely modify the aberration of the system.

In an embodiment, the fifth lens has negative refractive power, and an image-side surface thereof is concave, it may reduce back focal length and size. Besides, the fifth lens has at least an inflection point on a surface thereof, which may reduce an incident angle of the light of an off-axis field of view and modify the aberration of the off-axis field of view. It is preferable that both surfaces of the fifth lens have at least an inflection point on a surface thereof.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
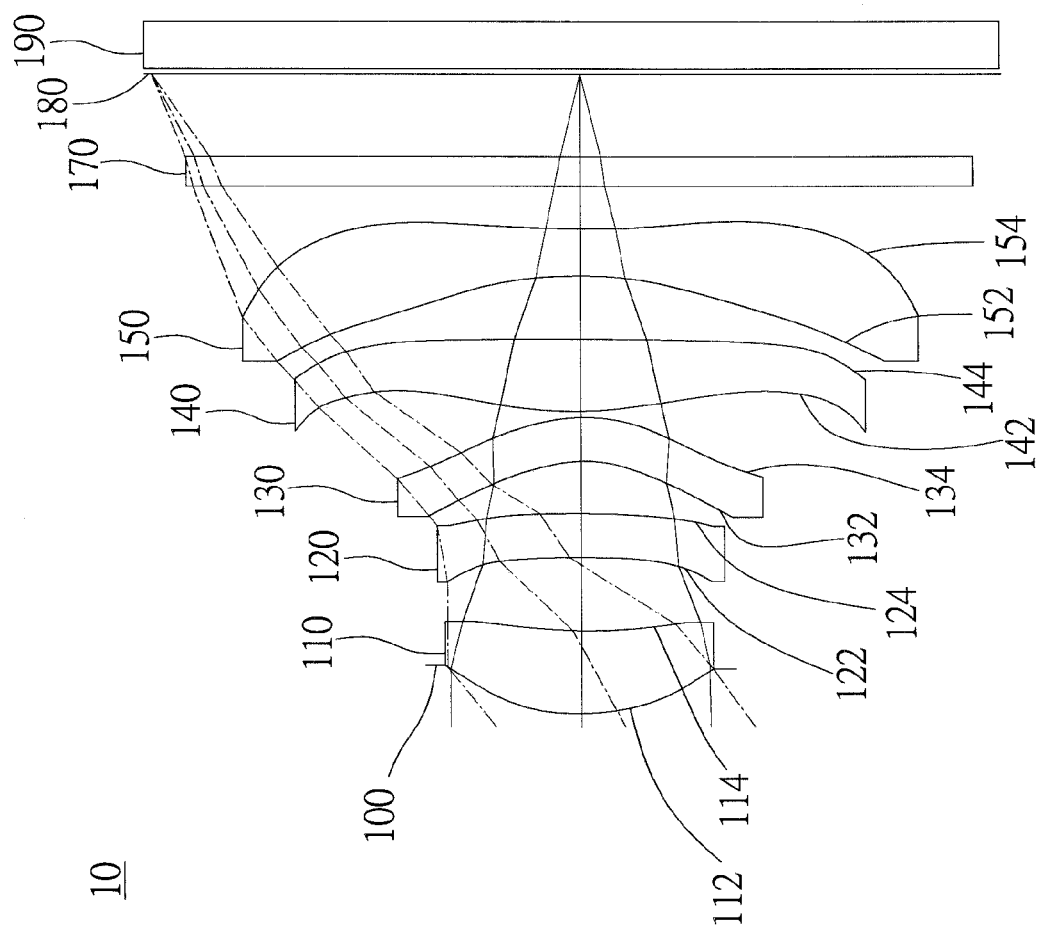
FIG. 1A is a schematic diagram of a first preferred embodiment of the present invention.

An optical image capturing system of the present invention includes a first lens, a second lens, a third lens, a forth lens, and a fifth lens from an object side to an image side with refractive power. The optical image capturing system further is provided with an image sensor at an image plane.

The optical image capturing system works in three wavelengths, including 486.1 nm, 510 nm, 587.5 nm, and 656.2 nm, wherein 587.5 nm is the main reference wavelength, and 555 nm is the reference wavelength for obtaining the technical characters.

The optical image capturing system of the present invention satisfies $0.5 \leq \Sigma PPR/|\Sigma NPR| \leq 2.5$, and a preferable range is $1 \leq \Sigma PPR/|\Sigma NPR| \leq 2.0$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; $\Sigma PPR$ is a sum of the PPRs of each positive lens; and $\Sigma NPR$ is a sum of the NPRs of each negative lens. It is helpful to control of an entire refractive power and an entire length of the optical image capturing system.

HOS is a height of the optical image capturing system, and when the ratio of HOS/f approaches to 1, it is helpful to decrease of size and increase of imaging quality.

In an embodiment, the optical image capturing system of the present invention satisfies $0 \leq \Sigma PP \leq 200$ and $f1/\Sigma PP \leq 0.85$, where $\Sigma PP$ is a sum of a focal length fp of each lens with positive refractive power, and $\Sigma NP$ is a sum of a focal length fn of each lens with negative refractive power. It is helpful to control of focusing capacity of the system and redistribution of the positive refractive powers of the system to avoid the significant aberration in early time. The optical image capturing system further satisfies $\Sigma NP < -0.1$ and $0.01 \leq f5/\Sigma NP \leq 0.85$, which is helpful to control of an entire refractive power and an entire length of the optical image capturing system.

The first lens has positive refractive power, and an object-side surface, which faces the object side, thereof is convex. It may modify the positive refractive power of the first lens as well as shorten the entire length of the system.

The second lens has negative refractive power, which may correct the aberration of the first lens.

The third lens has positive refractive power, which may share the positive refractive power of the first lens. It may share the positive refractive power of the first lens to reduce an increase of the aberration and reduce a sensitivity of the system.

The fourth lens has positive refractive power, and an image-side surface thereof, which faces the image side, is convex. It may share the positive refractive power of the first lens to reduce an increase of the aberration and reduce a sensitivity of the system.

The fifth lens has negative refractive power, and an image-side surface thereof, which faces the image side, is concave. It may shorten a rear focal length to reduce the size of the system. In addition, the fifth lens is provided with at least an inflection point on at least a surface to reduce an incident angle of the light of an off-axis field of view and modify the aberration of the off-axis field of view. It is preferable that each surface, the object-side surface and the image-side surface, of the fifth lens has at least an inflection point.

The image sensor is provided on the image plane. The optical image capturing system of the present invention satisfies $HOS/HOI \leq 3$ and $0.5 \leq HOS/f \leq 5.0$, and a preferable range is $1 \leq HOS/HOI \leq 2.5$ and $1 \leq HOS/f \leq 2$, where HOI is height for image formation of the optical image capturing system, i.e., the maximum image height, and HOS is a height of the optical image capturing system, i.e. a distance on the optical axis between the object-side surface of the first lens and the image plane. It is helpful to reduction of size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies $0.5 \leq InS/HOS \leq 1.1$, and a preferable range is $0.8 \leq InS/HOS \leq 1$, where InS is a distance between the aperture and the image plane. It is helpful to size reduction and wide angle.

The optical image capturing system of the present invention satisfies $0.45 \leq \Sigma TP/InTL \leq 0.95$, where InTL is a distance between the object-side surface of the first lens and the image-side surface of the fifth lens, and $\Sigma TP$ is a sum of central thicknesses of the lenses on the optical axis. It is helpful to the contrast of image and yield rate of manufacture, and provides a suitable back focal length for installation of other elements.

The optical image capturing system of the present invention satisfies $0.1 \leq |R1/R2| \leq 5$, and a preferable range is $0.1 \leq |R1/R2| \leq 4$, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies $-200<(R9-R10)/(R9+R10)<30$, where R9 is a radius of curvature of the object-side surface of the fifth lens, and R10 is a radius of curvature of the image-side surface of the fifth lens. It may modify the astigmatic field curvature.

The optical image capturing system of the present invention satisfies $0<IN12/f\le 2.0$, and a preferable range is $0.01\le IN12/f\le 0.20$, where IN12 is a distance on the optical axis between the first lens and the second lens. It may correct chromatic aberration and improve the performance.

The optical image capturing system of the present invention satisfies $0<(TP1+IN12)/TP2\le 10$, where TP1 is a central thickness of the first lens on the optical axis, and TP2 is a central thickness of the second lens on the optical axis. It may control the sensitivity of manufacture of the system and improve the performance.

The optical image capturing system of the present invention satisfies $0.2\le(TP5+IN45)/TP4\le 3$, where TP4 is a central thickness of the fourth lens on the optical axis, TP5 is a central thickness of the fifth lens on the optical axis, and N45 is a distance between the fourth lens and the fifth lens. It may control the sensitivity of manufacture of the system and improve the performance.

The optical image capturing system of the present invention satisfies $0.1\le(TP2+TP3+TP4)/\Sigma TP\le 0.9$, and a preferable range is $0.4\le(TP2+TP3+TP4)/\Sigma TP\le 0.8$, where TP2 is a central thickness of the second lens on the optical axis, TP3 is a central thickness of the third lens on the optical axis, TP4 is a central thickness of the fourth lens on the optical axis, TP5 is a central thickness of the fifth lens on the optical axis, and $\Sigma TP$ is a sum of the central thicknesses of all the lenses on the optical axis. It may finely modify the aberration of the incident rays and reduce the height of the system.

The optical image capturing system of the present invention satisfies $-1.5$ mm$\le$InRS51$\le 1.5$ mm; $-1.5$ mm$\le$InRS52$\le 1.5$ mm; 0 mm$<|$InRS51$|+|$InRS52$|\le 3$ mm; $0.01\le|$InRS51$|/$TP5$\le 10$; and $0.01\le|$InRS52$|/$TP5$\le 10$, where InRS51 is a displacement in parallel with the optical axis from a point on the object-side surface of the fifth lens, through which the optical axis passes, to a point at the maximum effective semi diameter of the object-side surface of the first lens; InRS52 is a displacement in parallel with the optical axis from a point on the image-side surface of the fifth lens, through which the optical axis passes, to a point at the maximum effective semi diameter of the image-side surface of the fifth lens; and TP5 is a central thickness of the fifth lens on the optical axis. It may control a ratio of the central thickness of the fifth lens and the effective semi diameter thickness (thickness ratio) to increase the yield rate of manufacture.

The optical image capturing system of the present invention satisfies $0<SGI511/(SGI511+TP5)\le 0.9$ and $0<SGI521/(SGI521+TP5)\le 0.9$, and a preferable range is $0.01<SGI511/(SGI511+TP5)\le 0.7$ and $0.01<SGI521/(SGI521+TP5)\le 0.7$, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

The optical image capturing system of the present invention satisfies $0<SGI512/(SGI512+TP5)\le 0.9$ and $0<SGI522/(SGI522+TP5)\le 0.9$, and a preferable range is $0.1\le SGI512/(SGI512+TP5)\le 0.8$ and $0.1\le SGI522/(SGI522+TP5)\le 0.8$, SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the image-side surface, which is the second closest to the optical axis.

The optical image capturing system of the present invention satisfies $0.01\le HIF511/HOI\le 0.9$ and $0.01\le HIF521/HOI\le 0.9$, and a preferable range is $0.09\le HIF511/HOI\le 0.5$ and $0.09\le HIF521/HOI\le 0.5$, where HIF511 is a distance perpendicular to the optical axis between the inflection point on the object-side surface of the fifth lens, which is the closest to the optical axis, and the optical axis, and HIF521 is a distance perpendicular to the optical axis between the inflection point on the image-side surface of the fifth lens, which is the closest to the optical axis, and the optical axis.

The optical image capturing system of the present invention satisfies $0.01\le HIF512/HOI\le 0.9$ and $0.01\le HIF522/HOI\le 0.9$, and a preferable range is $0.09\le HIF512/HOI\le 0.8$ and $0.09\le HIF522/HOT\le 0.8$, where HIF512 is a distance perpendicular to the optical axis between the inflection point on the object-side surface of the fifth lens, which is the second closest to the optical axis, and the optical axis, and HIF522 is a distance perpendicular to the optical axis between the inflection point on the image-side surface of the fifth lens, which is the second closest to the optical axis, and the optical axis.

In an embodiment, the lenses of high Abbe number and the lenses of low Abbe number are arranged in an interlaced arrangement that could be helpful to correction of aberration of the system.

An equation of aspheric surface is $$z=ch^2/[1+[1(k+1)c^2h^2]^{0.5}]+A4h^4+A6h^6+A8h^8+A10h^{10}+A12h^{12}+A14h^{14}+A16h^{16}+A18h^{18}+A20h^{20} \qquad (1)$$

where z is a depression of the aspheric surface; k is conic constant; c is reciprocal of radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of refractive power of the system. In addition, the opposite surfaces (object-side surface and image-side surface) of the first to the fifth lenses could be aspheric that can obtain more control parameters to reduce aberration. The number of aspheric glass lenses could be less than the conventional spherical glass lenses that is helpful to reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention further is provided with a diaphragm to increase image quality.

In the optical image capturing system, the diaphragm could be a front diaphragm or a middle diaphragm, wherein the front diaphragm is provided between the object and the first lens, and the middle is provided between the first lens and the image plane. The front diaphragm provides a long distance between an exit pupil of the system and the image plane, which allows more elements to be installed. The middle diaphragm could enlarge a view angle of view of the system and increase the efficiency of the image sensor. The middle diaphragm is helpful to size reduction and wide angle.

The optical image capturing system of the present invention could be applied in dynamic focusing optical system. It is superior in correction of aberration and high imaging quality so that it could be allied in lots of fields.

We provide several embodiments in conjunction with the accompanying drawings for the best understanding, which are:

First Embodiment

Figures 1B, 1C:
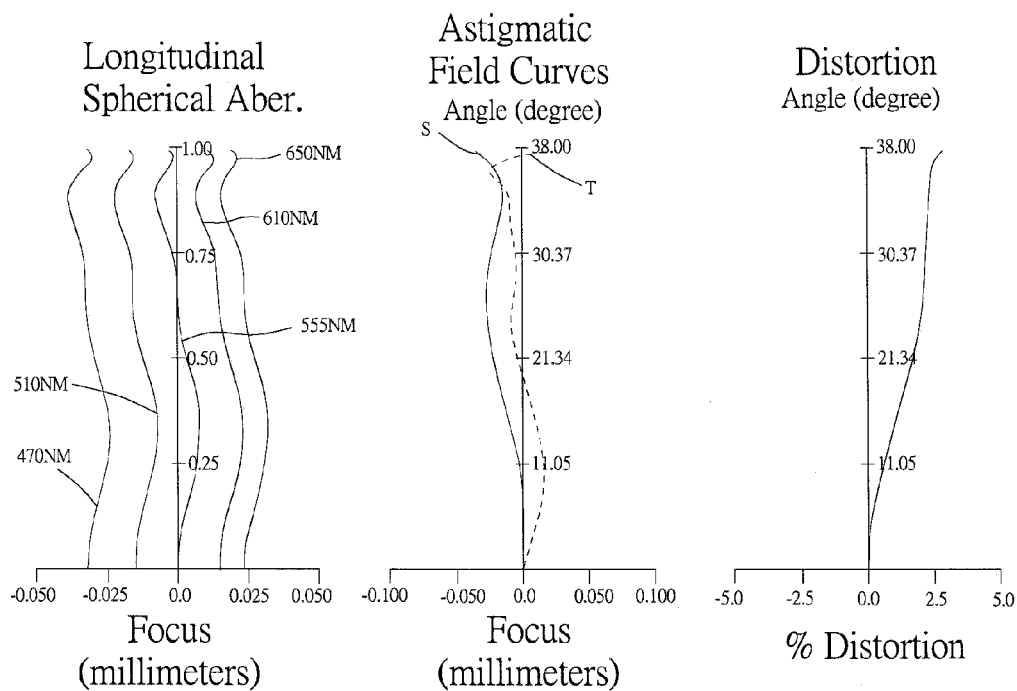
FIG. 1B shows curve diagrams of longitudinal spherical aberration, astigmatic field, and optical distortion of the optical image capturing system in the order from left to right of the first embodiment of the present application.
FIG. 1C shows a curve diagram of TV distortion of the optical image capturing system of the first embodiment of the present application.

As shown in FIG. 1A and FIG. 1B, an optical image capturing system 100 of the first preferred embodiment of the present invention includes, along an optical axis from an object side to an image side, an aperture 100, a first lens 110, a second lens 120, a third lens 130, a fourth lens 140, a fifth lens 150, an infrared rays filter 170, an image plane 180, and an image sensor 190.

The first lens 110 has positive refractive power, and is made of plastic. An object-side surface 112 thereof, which faces the object side, is a convex aspheric surface, and an image-side surface 114 thereof, which faces the image side, is a concave aspheric surface, and the image-side surface has an inflection point. The first lens 110 satisfies SGI121=0.0387148 mm and |SGI121|/(|SGI121|+TP1)= 0.061775374, where SGI121 is a displacement in parallel with the optical axis from a point on the image-side surface of the first lens, through which the optical axis passes, to the inflection point on the image-side surface, which is the closest to the optical axis.

The first lens 110 further satisfies HIF121=0.61351 mm and HIF121/HOI=0.209139253, where HIF121 is a displacement perpendicular to the optical axis from a point on the image-side surface of the first lens, through which the optical axis passes, to the inflection point, which is the closest to the optical axis.

The second lens 120 has negative refractive power, and is made of plastic. An object-side surface 122 thereof, which faces the object side, is a concave aspheric surface, and an image-side surface 124 thereof, which faces the image side, is a convex aspheric surface, and the image-side surface 124 has an inflection point. The second lens 120 satisfies SGI221=−0.0657553 mm and |SGI221|/(|SGI221|+TP2)= 0.176581512, where SGI221 is a displacement in parallel with the optical axis from a point on the image-side surface of the second lens, through which the optical axis passes, to the inflection point on the image-side surface, which is the closest to the optical axis.

The second lens further satisfies HIF221=0.84667 mm and HIF221/HOI=0.288621101, where HIF221 is a displacement perpendicular to the optical axis from a point on the image-side surface of the second lens, through which the optical axis passes, to the inflection point, which is the closest to the optical axis.

The third lens 130 has negative refractive power, and is made of plastic. An object-side surface 132, which faces the object side, is a concave aspheric surface, and an image-side surface 134, which faces the image side, is a convex aspheric surface, and each of them has two inflection points. The third lens 130 satisfies SGI311=−0.341027 mm; SGI321=−0.231534 mm and |SGI311|/(|SGI311|+TP3)=0.525237108 and |SGI321|/(|SGI321|+TP3)=0.428934269, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

The third lens 130 satisfies SGI312=−0.376807 mm; SGI322=−0.382162 mm; |SGI312|(|SGI312|+TP5), 0.550033428; |SGI322|/(|SGI322|+TP3)=0.55352345, where SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the image-side surface, which is the second closest to the optical axis.

The third lens 130 further satisfies HIF311=0.987648 mm; HIF321=0.805604 mm; HIF311/HOI=0.336679052; and HIF321/HOI=0.274622124, where HIF311 is a distance perpendicular to the optical axis between the inflection point on the object-side surface of the third lens, which is the closest to the optical axis, and the optical axis, and HIF321 is a distance perpendicular to the optical axis between the inflection point on the image-side surface of the third lens, which is the closest to the optical axis, and the optical axis.

The third lens 130 further satisfies HIF312=1.0493 mm; HIF322=1.17741 mm; HIF312/HOI=0.357695585; and HIF322/HOI=0.401366968, where HIF312 is a distance perpendicular to the optical axis between the inflection point on the object-side surface of the third lens, which is the second the closest to the optical axis, and the optical axis, and HIF322 is a distance perpendicular to the optical axis, between the inflection point on the image-side surface of the third lens, which is the second the closest to the optical axis, and the optical axis.

The fourth lens 140 has positive refractive power, and is made of plastic. Both an object-side surface 142, which faces the object side, and an image-side surface 144, which faces the image side, thereof are convex aspheric surfaces, and the object-side surface 142 has an inflection point. The fourth lens 140 satisfies SGI411=0.0687683 mm and |SGI411|/(|SGI411|+TP4)=0.118221297, where SGI411 is a displacement in parallel with the optical axis from a point on the object-side surface of the fourth lens, through which the optical axis passes, to the inflection point on the object-side surface, which is the closest to the optical axis.

The fourth lens 140 further satisfies HIF411=0.645213 mm and HIF411/HOI=0.21994648, where HIF411 is a distance perpendicular to the optical axis between the inflection point on the object-side surface of the fourth lens, which is the closest to the optical axis, and the optical axis.

The fifth lens 150 has negative refractive power, and is made of plastic. Both an object-side surface 152, which faces the object side, and an image-side surface 154, which faces the image side, thereof are concave aspheric surfaces. The object-side surface 152 has three inflection points, and the image-side surface 154 has an inflection point. The fifth lens 150 satisfies SGI511=−0.236079 mm; SGI521=0.023266 mm; |SGI511|/(|SGI511|+TP5)= 0.418297214; and |SGI521|/(|SGI521|+TP5)= 0.066177809, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

The fifth lens 150 further satisfies SGI512=−0.325042 mm and |SGI512|/(|SGI512|+TP5)=0.497505143, where SGI512 is a displacement in parallel with the optical axis, from a point on the object-side surface of the fifth lens, through which the optical axis passes, to the inflection point on the object-side surface, which is the second closest to the optical axis.

The fifth lens 150 further satisfies SGI513=−0.538131 mm; and |SGI513|/(|SGI513|+TP5)=0.621087839, where SGI513 is a displacement in parallel with the optical axis, from a point on the object-side surface of the fifth lens, through which the optical axis passes, to the inflection point on the object-side surface, which is the third closest to the optical axis.

The fifth lens 150 further satisfies HIF511=1.21551 mm; HIF521=0.575738 mm; HIF511/HOI=0.414354866; and HIF521/HOI=0.196263167, where HIF511 is a distance perpendicular to the optical axis between the inflection point on the object-side surface of the fifth lens, which is the closest to the optical axis, and the optical axis, and HIF521 is a distance perpendicular to the optical axis between the inflection point on the image-side surface of the fifth lens, which is the closest to the optical axis, and the optical axis.

The fifth lens 150 further satisfies HIF512=1.49061 mm and HIF512/HOI=0.508133629, where HIF512 is a distance perpendicular to the optical axis between the inflection point on the object-side surface of the fifth lens, which is the second the closest to the optical axis, and the optical axis.

The fifth lens 150 further satisfies HIF513=2.00664 mm and HIF513/HOI=0.684042952, where HIF513 is a distance perpendicular to the optical axis between the inflection point on the object-side surface of the fifth lens, which is the third closest to the optical axis, and the optical axis.

The infrared rays filter 170 is made of glass, and between the fifth lens 150 and the image plane 180. The infrared rays filter 170 gives no contribution to the focal length of the system.

The optical image capturing system of the first preferred embodiment has the following parameters, which are f=3.73172 mm; f/HEP=2.05; and HAF=37.5 degrees and tan(HAF)=0.7673, where f is a focal length of the system; HAF is a half of the maximum field angle; and HEP is an entrance pupil diameter.

The parameters of the lenses of the first preferred embodiment are f1=3.7751 mm; |f/f1|=0.9885; f5=−3.6601 mm; |f1|>f5; and |f1/f5|=1.0314, where f1 is a focal length of the first lens 110; and f5 is a focal length of the fifth lens 150.

The first preferred embodiment further satisfies |f2+|f3+|f4|=77.3594 mm; |f1|+|f5|=7.4352 mm; and |f2|+|f3|+|f4|>|f1|+|f5|, where f2 is a focal length of the second lens 120; f3 is a focal length of the third lens 130; and f4 is a focal length of the fourth lens 140.

The optical image capturing system of the first preferred embodiment further satisfies ΣPPR=f/f1+f/f4=1.9785; ΣNPR=f/f2+f/f3+f/f5=−1.2901; ΣPPR/|ΣNPR|=1.5336; |f/f1|=0.9885; |f/f2|=0.0676; |f/f3|=0.2029; |f/f4|=0.9900; and |f/f5|=1.0196, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system of the first preferred embodiment further satisfies InTL+InB=HOS; HOS=4.5 mm; HOI=2.9335 mm; HOS/HOI=1.5340; HOS/f=1.2059; Intl/HOS=0.7597; and InS=4.19216 mm, where InTL is a distance between the object-side surface 112 of the first lens 110 and the image-side surface 154 of the fifth lens 150; HOS is a height of the image capturing system, i.e. a distance between the object-side surface 112 of the first lens 110 and the image plane 180; InS is a distance between the aperture 100 and the image plane 180; HOT is height for image formation of the optical image capturing system, i.e., the maximum image height; and InB is a distance between the image-side surface 154 of the fifth lens 150 and the image plane 180.

The optical image capturing system of the first preferred embodiment further satisfies ΣTP=2.044092 mm and ΣTP/InTL=0.5979, where ΣTP is a sum of the thicknesses of the lenses 110-150 with refractive power. It is helpful to the contrast of image and yield rate of manufacture, and provides a suitable back focal length for installation of other elements.

The optical image capturing system of the first preferred embodiment further satisfies |R1/R2|=0.3261, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system of the first preferred embodiment further satisfies (R9−R10)/(R9+R10)=−2.9828, where R9 is a radius of curvature of the object-side surface 152 of the fifth lens 150, and R10 is a radius of curvature of the image-side surface 154 of the fifth lens 150. It may modify the astigmatic field curvature.

The optical image capturing system of the first preferred embodiment further satisfies ΣPP=f1+f4=7.5444 mm and f1/(f1+f4)=0.5004, where ΣPP is a sum of the focal lengths fp of each lens with positive refractive power. It is helpful to share the positive refractive power of the first lens 110 to the other positive lenses to avoid the significant aberration caused by the incident rays.

The optical image capturing system of the first preferred embodiment further satisfies ΣNP=f2+f3+f5=−77.2502 mm and f5/(f2+f3+f5)=0.0474, where f2, f3, and f5 are focal lengths of the second, the third, and the fifth lenses, and ΣNP is a sum of the focal lengths fp of each lens with negative refractive power. It is helpful to share the negative refractive power of the fifth lens 150 to the other negative lenses to avoid the significant aberration caused by the incident rays.

The optical image capturing system of the first preferred embodiment further satisfies IN12=0.511659 mm and IN12/f=0.1371, where IN12 is a distance on the optical axis between the first lens 110 and the second lens 120. It may correct chromatic aberration and improve the performance.

The optical image capturing system of the first preferred embodiment further satisfies TP1=0.587988 mm; TP2=0.306624 mm; and (TP1+IN12)/TP2=3.5863, where TP1 is a central thickness of the first lens 110 on the optical axis, and TP2 is a central thickness of the second lens 120 on the optical axis. It may control the sensitivity of manufacture of the system and improve the performance.

The optical image capturing system of the first preferred embodiment further satisfies TP4=0.5129 mm; TP5=0.3283 mm; and (TP5+IN45)/TP4=1.5095, where TP4 is a central thickness of the fourth lens 140 on the optical axis, TP5 is a central thickness of the fifth lens 150 on the optical axis, and N45 is a distance on the optical axis between the fourth lens and the fifth lens. It may control the sensitivity of manufacture of the system and improve the performance.

The optical image capturing system of the first preferred embodiment further satisfies TP3=0.3083 mm and (TP2+TP3+TP4)/ΣTP=0.5517, where TP2, TP3, and TP4 are thicknesses on the optical axis of the second, the third, and the fourth lenses, and ΣTP is a sum of the central thicknesses of all the lenses with refractive power on the optical axis. It may finely modify the aberration of the incident rays and reduce the height of the system.

The optical image capturing system of the first preferred embodiment further satisfies InRS51=−0.576871 mm; InRS52=−0.555284 mm; |InRS51|+|InRS52|=1.1132155 mm; |InRS51|/TP5=1.7571; and |InRS52|/TP5=1.691, where InRS51 is a displacement in parallel with the optical axis from a point on the object-side surface 152 of the fifth lens, through which the optical axis passes, to a point at the maximum effective semi diameter of the object-side surface 152 of the fifth lens; InRS52 is a displacement in parallel with the optical axis from a point on the image-side surface 154 of the fifth lens, through which the optical axis passes, to a point at the maximum effective semi diameter of the image-side surface 154 of the fifth lens; and TP5 is a central thickness of the fifth lens 150 on the optical axis. It is helpful to manufacture and molding of the lenses, and keeping the miniature size.

The second lens 120 and the fifth lens 150 of the optical image capturing system of the first preferred embodiment have negative refractive power, and the optical image capturing system further satisfies NA5/NA2=2.5441, where NA2 is an Abbe number of the second lens 120, and NA5 is an Abbe number of the fifth lens 150. It may correct the aberration of the system.

The optical image capturing system of the first preferred embodiment further satisfies |TDT|=0.6343% and |ODT|=2.5001%, where TDT is TV distortion; and ODT is optical distortion.

The parameters of the lenses of the first embodiment are listed in Table 1 and Table 2.

TABLE 1 f = 3.73172 mm; f/HEP = 2.05; HAF = 37.5 deg; tan(HAF) = 0.7673

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | plane | −0.30784 | | | | |
| 2 | 1$^{st}$ lens | 1.48285 | 0.587988 | plastic | 1.5441 | 56.1 | 3.77514 |
| 3 | | 4.54742 | 0.511659 | | | | |
| 4 | 2$^{nd}$ lens | −9.33807 | 0.306624 | plastic | 1.6425 | 22.465 | −55.2008 |
| 5 | | −12.8028 | 0.366935 | | | | |
| 6 | 3$^{rd}$ lens | −1.02094 | 0.308255 | plastic | 1.6425 | 22.465 | −18.3893 |
| 7 | | −1.2492 | 0.05 | | | | |
| 8 | 4$^{th}$ lens | 2.18916 | 0.512923 | plastic | 1.5441 | 56.1 | 3.7693 |
| 9 | | −31.3936 | 0.44596 | | | | |
| 10 | 5$^{th}$ lens | −2.86353 | 0.328302 | plastic | 1.514 | 57.1538 | −3.6601 |
| 11 | | 5.75188 | 0.3 | | | | |
| 12 | Filter | plane | 0.2 | | 1.517 | 64.2 | |
| 13 | | plane | 0.58424 | | | | |
| 14 | Image plane | plane | −0.00289 | | | | |

Reference wavelength: 555 nm

TABLE 2

Coefficients of the aspheric surfaces

| Surface | 2 | 3 | 4 | 5 | 6 |
|---|---|---|---|---|---|
| k | −1.83479 | −20.595808 | 16.674705 | 11.425456 | −4.642191 |
| A4 | 6.89867E−02 | 2.25678E−02 | −1.11828E−01 | −4.19899E−02 | −7.09315E−02 |
| A6 | 2.35740E−02 | −6.17850E−02 | −6.62880E−02 | −1.88072E−02 | 9.65840E−02 |
| A8 | −4.26369E−02 | 5.82944E−02 | −3.35190E−02 | −6.98321E−02 | −7.32044E−03 |
| A10 | 5.63746E−03 | −2.73938E−02 | −7.28886E−02 | −1.13079E−02 | −8.96740E−02 |
| A12 | 7.46740E−02 | −2.45759E−01 | 4.05955E−02 | 6.79127E−02 | −3.70146E−02 |
| A14 | −6.93116E−02 | 3.43401E−01 | 1.60451E−01 | 2.83769E−02 | 5.00641E−02 |
| A16 | −2.04867E−02 | −1.28084E−01 | 1.24448E−01 | −2.45035E−02 | 7.50413E−02 |
| A18 | 1.99910E−02 | −2.32031E−02 | −1.94856E−01 | 2.90241E−02 | −5.10392E−02 |
| A20 | | | | | |

| Surface | 7 | 8 | 9 | 10 | 11 |
|---|---|---|---|---|---|
| k | −1.197201 | −20.458388 | −50 | −2.907359 | −50 |
| A4 | 3.64395E−02 | −1.75641E−02 | −7.82211E−04 | −1.58711E−03 | −2.46339E−02 |
| A6 | 2.22356E−02 | −2.87240E−03 | −2.47110E−04 | −3.46504E−03 | 6.61804E−04 |
| A8 | 7.09828E−03 | −2.56360E−04 | −3.78130E−04 | 4.52459E−03 | 1.54143E−04 |
| A10 | 5.05740E−03 | 7.39189E−05 | −1.22232E−04 | 1.05841E−04 | −2.83264E−05 |

TABLE 2-continued

| | | Coefficients of the aspheric surfaces | | | |
|---|---|---|---|---|---|
| A12 | −4.51124E−04 | −5.53116E−08 | −1.50294E−05 | −5.57252E−04 | −5.78839E−06 |
| A14 | −1.84003E−03 | 8.16043E−06 | −5.41743E−07 | 4.41714E−05 | −2.91861E−07 |
| A16 | −1.28118E−03 | 2.10395E−06 | 2.98820E−07 | 1.80752E−05 | 8.25778E−08 |
| A18 | 4.09004E−04 | −1.21664E−06 | 2.73321E−07 | −2.27031E−06 | −9.87595E−09 |
| A20 | | | | | |

The detail parameters of the first preferred embodiment are listed in Table 1, in which the unit of radius of curvature, thickness, and focal length are millimeter, and surface 0-14 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
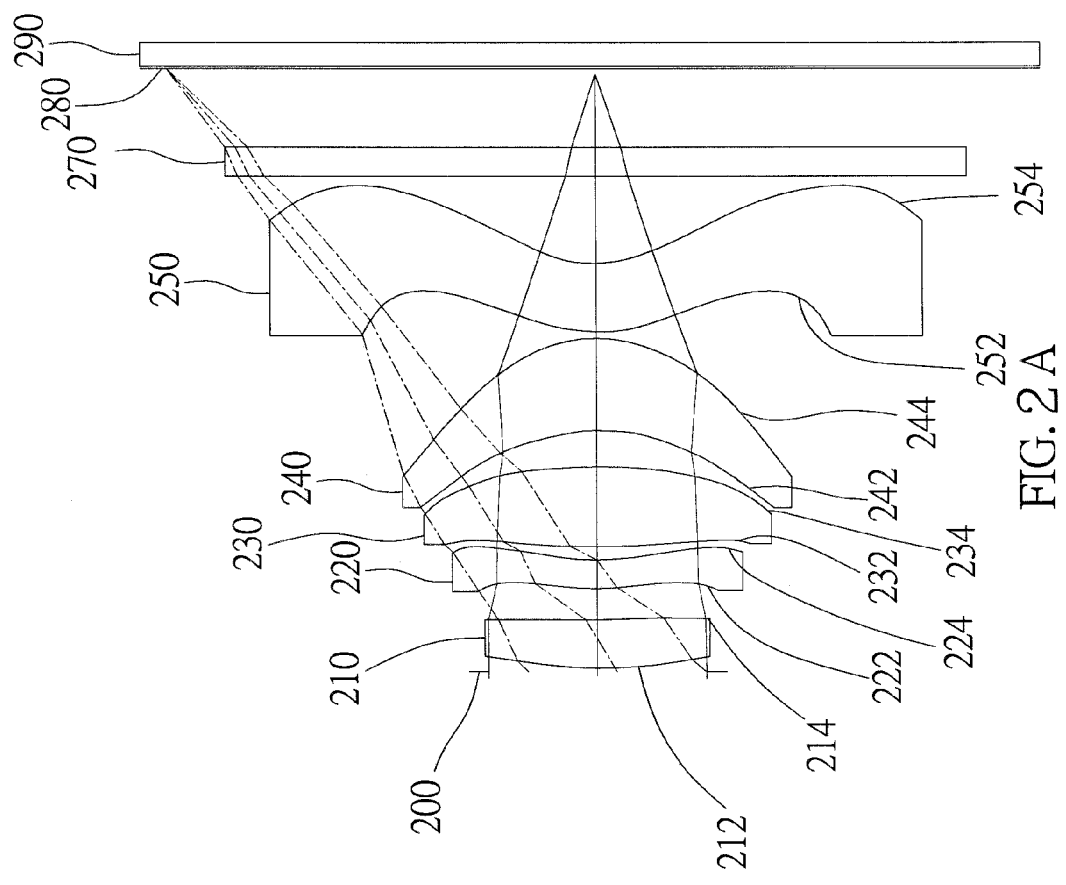
FIG. 2A is a schematic diagram of a second preferred embodiment of the present invention.
Figure 2:
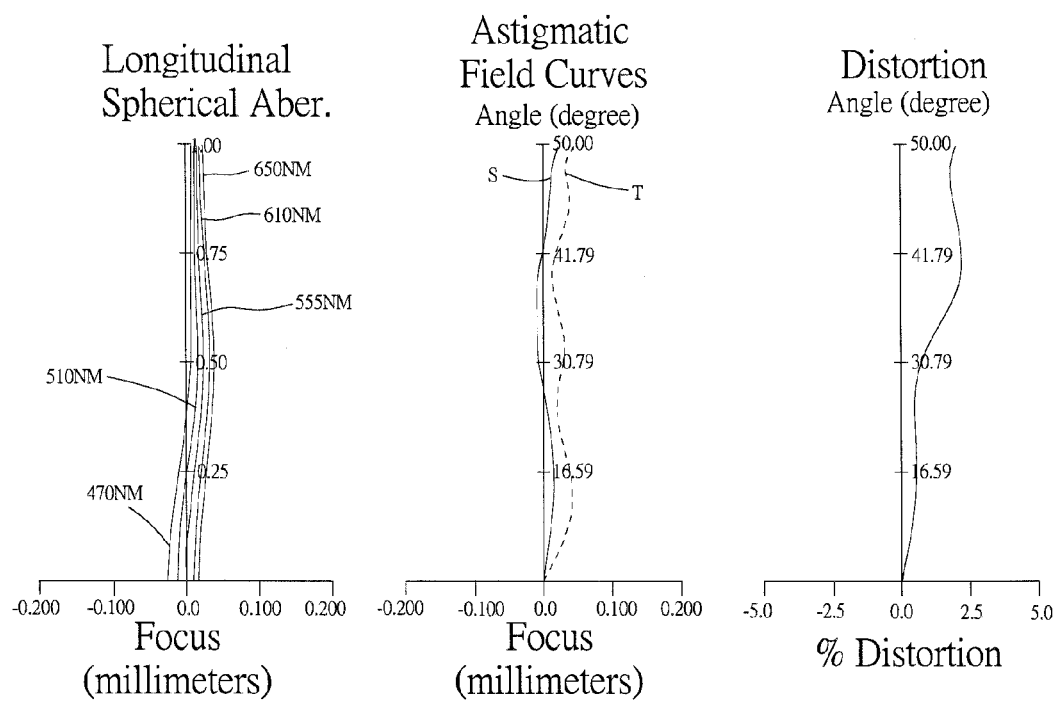
FIG. 2B shows curve diagrams of longitudinal spherical aberration, astigmatic field, and optical distortion of the optical image capturing system in the order from left to right of the second embodiment of the present application.
FIG. 2C shows a curve diagram of TV distortion of the optical image capturing system of the second embodiment of the present application.
Figure 2:
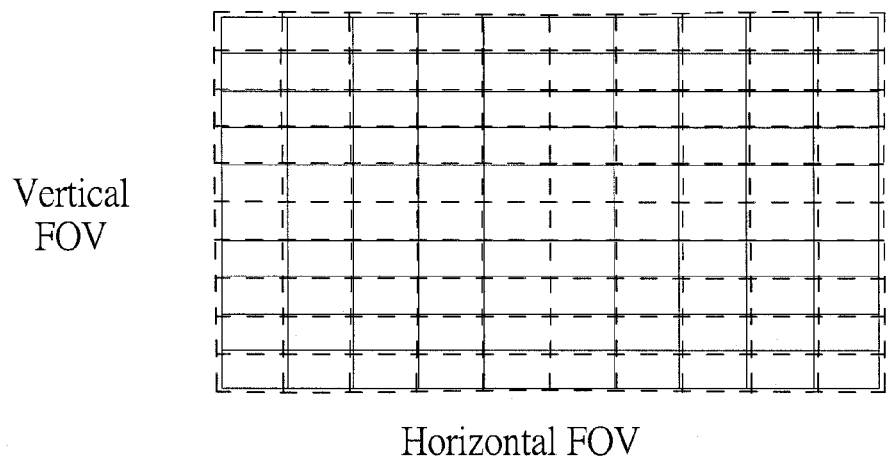

As shown in FIG. 2A and FIG. 2B, an optical image capturing system of the second preferred embodiment of the present invention includes, along an optical axis from an object side to an image side, an aperture 200, a first lens 210, a second lens 220, a third lens 230, a fourth lens 240, a fifth lens 250, an infrared rays filter 270, an image plane 280, and an image sensor 290.

The first lens 210 has positive refractive power, and is made of plastic. An object-side surface 212 thereof, which faces the object side, is a convex aspheric surface, and an image-side surface 214 thereof, which faces the image side, is a concave aspheric surface. The object-side surface 212 and the image-side surface 214 each has an inflection point.

The second lens 220 has negative refractive power, and is made of plastic. An object-side surface 222, which faces the object side, thereof has a convex aspheric surface, and an image-side surface 224, which faces the image side, thereof is a concave aspheric surface. The object-side surface 222 and the image-side surface 224 each has an inflection point.

The third lens 230 has positive refractive power, and is made of plastic. An object-side surface 232, which faces the object side, is a convex aspheric surface, and an image-side surface 234, which faces the image side, is a convex aspheric surface, and the object-side surface 232 has an inflection point.

The fourth lens 240 has positive refractive power, and is made of plastic. An object-side surface 242, which faces the object side, thereof is a concave aspheric surface, and an image-side surface 244, which faces the image side, thereof is a convex aspheric surface. The image-side surface 244 and the image-side surface 244 each has an inflection point.

The fifth lens 250 has negative refractive power, and is made of plastic. An object-side surface 252, which faces the object side, is a convex aspheric surface, and an image-side surface 254, which faces the image side, is a concave aspheric surface. The object-side surface 252 and the image-side surface 254 each has an inflection point.

The infrared rays filter 270 is made of glass, and between the fifth lens 250 and the image plane 280. The infrared rays filter 270 gives no contribution to the focal length of the system.

The optical image capturing system of the second preferred embodiment has the following parameters, which are |f2|+|f3|+|f4|=23.5926 mm, |f1|+|f5|=18.5550 mm, and |f2|+|f3|+|f4|>|f1|+|f5|, where f1 is a focal length of the first lens 210; f2 is a focal length of the second lens 220; f3 is a focal length of the third lens 230; f4 is a focal length of the fourth lens 240; and f5 is a focal length of the fifth lens 250.

The optical image capturing system of the second preferred embodiment further satisfies TP4=0.63064 mm and TP5=0.47037 mm, where TP4 is a thickness of the fourth lens on the optical axis, and TP5 is a thickness of the fifth lens on the optical axis.

In the second embodiment, the first, the third, and the fourth lenses 210, 230, and 240 are positive lenses, and their focal lengths are f1, f3, and f4. ΣPP is a sum of the focal lengths of each positive lens. It is helpful to share the positive refractive power of the first lens 210 to the other positive lenses to avoid the significant aberration caused by the incident rays.

In the second preferred embodiment, the second and the fifth lenses 220 and 250 are negative lenses, and their focal lengths are f2 and f5. ΣNP is a sum of the focal lengths of each negative lens. It is helpful to share the negative refractive power of the fifth lens 250 to the other negative lenses to avoid the significant aberration caused by the incident rays.

The parameters of the lenses of the second embodiment are listed in Table 3 and Table 4.

TABLE 3 f = 2.39882 mm; f/HEP = 1.6; HAF = 50.0001 deg; tan(HAF) = 1.1918

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | infinity | 0.023187 | | | | |
| 2 | 1st lens | 2.75623 | 0.336295 | plastic | 1.565 | 58 | 10.0194 |
| 3 | | 5.11922 | 0.221815 | | | | |
| 4 | 2nd lens | 2.49612 | 0.2 | plastic | 1.65 | 21.4 | −15.9171 |
| 5 | | 1.9503 | 0.085252 | | | | |
| 6 | 3rd lens | 3.96846 | 0.54386 | plastic | 1.565 | 58 | 3.83046 |
| 7 | | −4.55568 | 0.261501 | | | | |

TABLE 3-continued f = 2.39882 mm; f/HEP = 1.6; HAF = 50.0001 deg; tan(HAF) = 1.1918

| Surface | | Radius of curvature (mm) | Thickness (mm) | Material | Refractive index | Abbe number | Focal length (mm) |
|---|---|---|---|---|---|---|---|
| 8 | 4th lens | −1.21688 | 0.630638 | plastic | 1.565 | 58 | 3.84507 |
| 9 | | −0.92725 | 0.05 | | | | |
| 10 | 5th lens | 1.05879 | 0.470366 | plastic | 1.65 | 21.4 | −8.5356 |
| 11 | | 0.7337 | 0.6 | | | | |
| 12 | Filter | infinity | 0.2 | | 1.517 | 64.2 | |
| 13 | | infinity | 0.530577 | | | | |
| 14 | Image plane | infinity | | | | | |

Reference wavelength: 555 nm. The clear aperture of the fourth surface is 1.00 mm.

TABLE 4

Coefficients of the aspheric surfaces

| Surface | 2 | 3 | 4 | 5 | 6 |
|---|---|---|---|---|---|
| k   | −7.526236   | −50         | −7.140386   | −11.297968  | 1.235934    |
| A4  | −1.52748E−04 | −7.76900E−02 | −2.37254E−01 | −9.28523E−02 | −1.01158E−01 |
| A6  | −2.82924E−02 | −8.10776E−02 | 8.72894E−02 | −3.24025E−02 | −9.19680E−03 |
| A8  | 7.39354E−03 | 3.90879E−02 | −2.52597E−01 | 3.14491E−02 | 8.03189E−03 |
| A10 | −9.40301E−02 | −1.96861E−01 | −1.95761E−02 | −5.01982E−02 | 1.24352E−01 |
| A12 | 8.80435E−05 | 8.50353E−02 | −5.26989E−08 | 1.73800E−02 | −1.82268E−01 |
| A14 | 3.27915E−07 | −2.60667E−07 | 2.04814E−07 | 1.03678E−06 | 6.32774E−02 |

| Surface | 7 | 8 | 9 | 10 | 11 |
|---|---|---|---|---|---|
| k   | −42.199952  | −6.814967   | −1.906798   | −3.150943   | −3.120444   |
| A4  | −5.19222E−02 | −1.16523E−01 | −7.13085E−02 | −1.07691E−01 | −5.39070E−02 |
| A6  | −4.89301E−02 | −3.42403E−04 | −2.14142E−02 | 3.53305E−02 | 5.06056E−03 |
| A8  | −1.14816E−02 | −2.59585E−02 | 2.82371E−03 | −1.69048E−02 | 4.13197E−04 |
| A10 | 1.21461E−02 | 1.03148E−02 | 1.74342E−03 | −8.97485E−04 | −2.38263E−04 |
| A12 | 1.92447E−02 | 3.16319E−02 | 6.99617E−04 | 2.67081E−03 | 8.61673E−06 |
| A14 | −1.29619E−02 | −1.42257E−02 | 4.21532E−04 | −7.28291E−04 | 1.70416E−06 |

An equation of the aspheric surfaces of the second embodiment is the same as that of the first embodiment, and the definitions are the same as well.

Second embodiment (Reference wavelength: 555 nm)

| InRS11 | InRS12 | InRS21 | InRS22 | InRS31 | InRS32 |
|---|---|---|---|---|---|
| 0.08358 | −0.00571 | −0.01899 | 0.04865 | 0.02051 | −0.31948 |
| InRS41 | InRS42 | InRS51 | InRS52 | HVT51 | HVT52 |
| −0.53206 | −0.95148 | −0.02493 | 0.29595 | 1.17903 | 1.64514 |
| \|ODT\|% | \|TDT\|% | InRSO | InRSI | Σ\|InRS\| | |
| 2.20030 | 0.70860 | 0.68007 | 1.62126 | 2.30133 | |
| Σ\|InRS\|/ InTL | Σ\|InRS\|/ HOS | (\|InRS32\| + \|InRS41\|)/IN34 | (\|InRS42\| + \|InRS51\|)/IN45 | | |
| 0.82198 | 0.55718 | 3.2563 | 19.5282 | | |
| (\|InRS41\| + \|InRS42\| + \|InRS51\| + \|InRS52\|)/ InTL | | (\|InRS41\| + \|InRS42\| + \|InRS51\| + \|InRS52\|)/ HOS | | | |
| 0.64450 | | 0.43687 | | | |

| \|f/f1\| | \|f/f2\| | \|f/f3\| | \|f/f4\| | \|f/f5\| | \|f1/f2\| |
|---|---|---|---|---|---|
| 0.23942 | 0.15071 | 0.62625 | 0.62387 | 0.28104 | 0.62947 |
| ΣPPR | ΣNPR | ΣPPR/ \|ΣNPR\| | ΣPP | ΣNP | f1/ΣPP |
| 1.48954 | 0.43174 | 3.45004 | 17.69493 | −24.45270 | 0.56623 |
| f5/ΣNP | IN12/f | HVT52/ HOI | HVT52/ HOS | \|InRS51\|/ TP5 | \|InRS52\|/ TP5 |
| 0.34907 | 0.09247 | 0.56081 | 0.39831 | 0.0530 | 0.6292 |
| HOS | InTL | HOS/HOI | InS/HOS | InTL/HOS | ΣTP/InTL |
| 4.13030 | 2.79973 | 1.40798 | 1.00561 | 0.67785 | 0.77906 |
| HVT41 | HVT42 | | | | |
| 0 | 0 | | | | |

Second embodiment (Reference wavelength: 555 nm)

| HIF111 | 0.69767 | HIF111/ HOI | 0.23783 | SGI111 | 0.11463 | \|SGI111\|/ (\|SGI111\| + TP1) | 0.24333 |
|---|---|---|---|---|---|---|---|
| HIF121 | 0.43100 | HIF121/ HOI | 0.14692 | SGI121 | 0.01817 | \|SGI121\|/ (\|SGI121\| + TP1) | 0.04851 |
| HIF211 | 0.29344 | HIF211/ HOI | 0.10003 | SGI211 | 0.01126 | \|SGI211\|/ (\|SGI211\| + TP2) | 0.05329 |
| HIF221 | 0.40775 | HIF221/ HOI | 0.13900 | SGI221 | 0.03197 | \|SGI221\|/ (\|SGI221\| + TP2) | 0.13782 |
| HIF311 | 0.22772 | HIF311/ HOI | 0.07763 | SGI311 | 0.00143 | \|SGI311\|/ (\|SGI311\| + TP3) | 0.00344 |

-continued

| Second embodiment (Reference wavelength: 555 nm) | | | | | | |
|---|---|---|---|---|---|---|
| HIF312 | 0.92266 | HIF312/HOI | 0.31453 | SGI312 | −0.08159 | \|SGI312\|/(\|SGI312\| + TP3) | 0.16401 |
| HIF321 | 0.95878 | HIF321/HOI | 0.32684 | SGI321 | −0.26356 | \|SGI321\|/(\|SGI321\| + TP3) | 0.38789 |
| HIF411 | 0.79026 | HIF411/HOI | 0.26939 | SGI411 | −0.29246 | \|SGI411\|/(\|SGI411\| + TP4) | 0.32770 |
| HIF421 | 1.18152 | HIF421/HOI | 0.40277 | SGI421 | −0.75682 | \|SGI421\|/(\|SGI421\| + TP4) | 0.55780 |
| HIF511 | 0.61221 | HIF511/HOI | 0.20870 | SGI511 | 0.11515 | \|SGI511\|/(\|SGI511\| + TP5) | 0.22973 |
| HIF521 | 0.62495 | HIF521/HOI | 0.21304 | SGI521 | 0.17690 | \|SGI521\|/(\|SGI521\| + TP5) | 0.31423 |

Third Embodiment

Figure 3A:
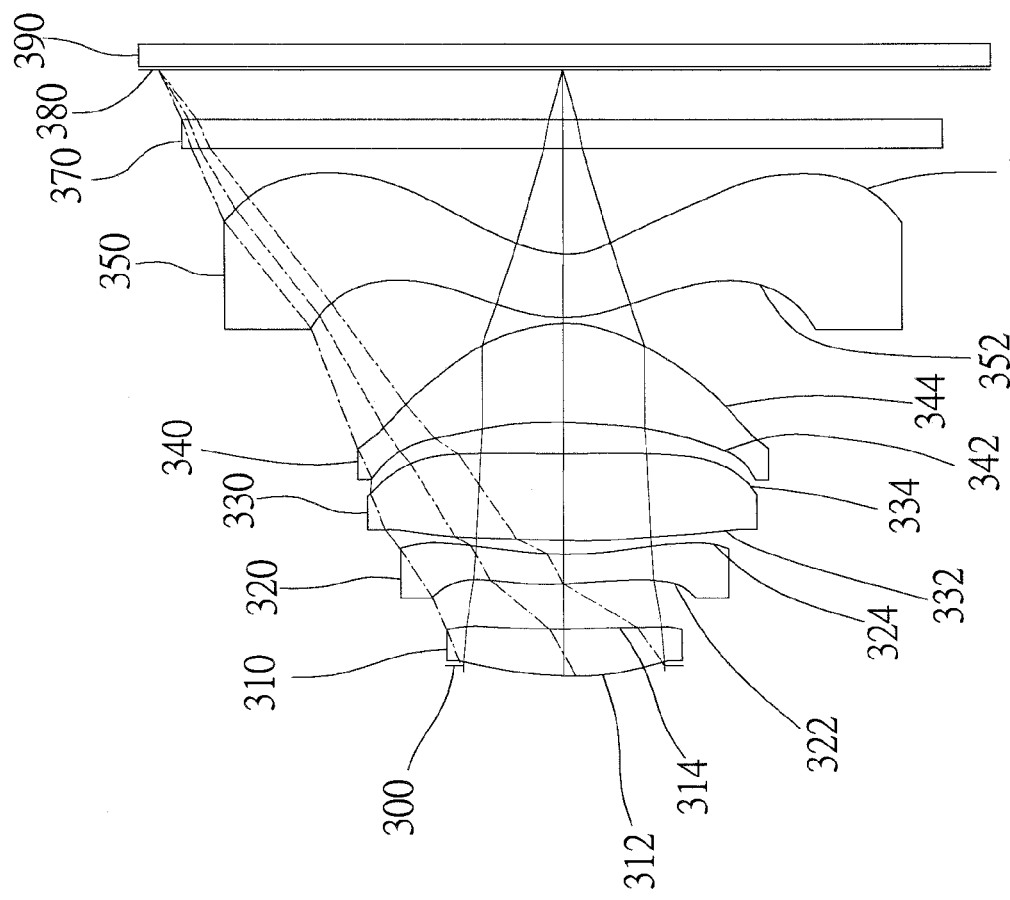
FIG. 3A is a schematic diagram of a third preferred embodiment of the present invention.
Figure 3:
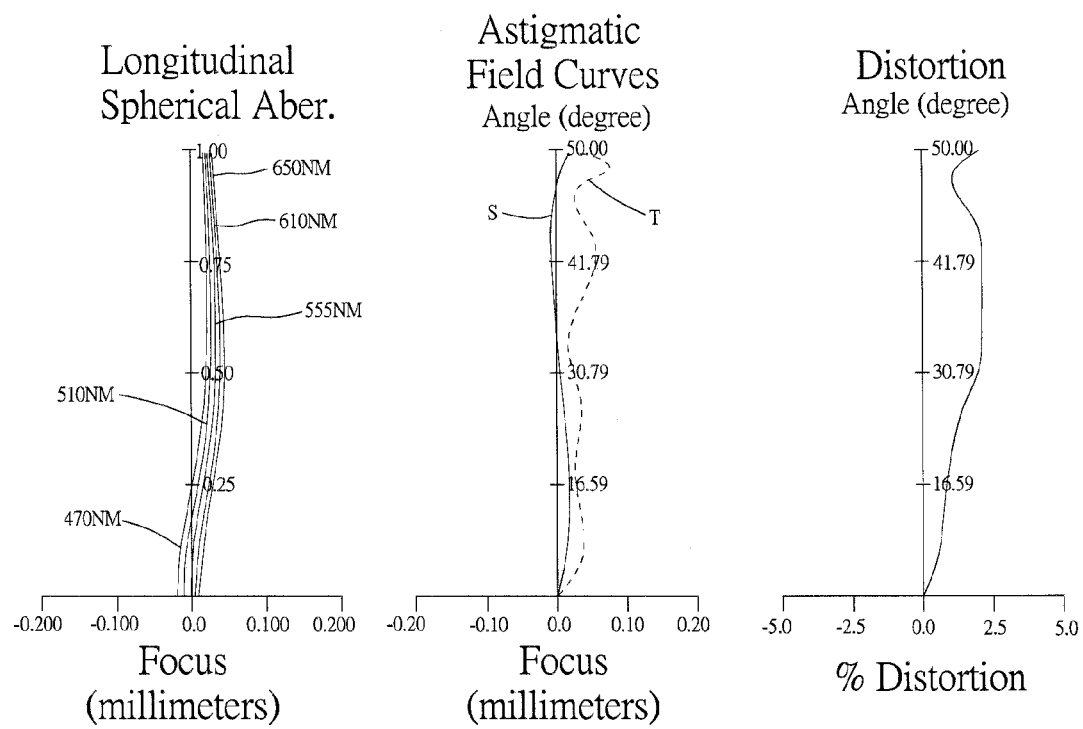
FIG. 3B shows curve diagrams of longitudinal spherical aberration, astigmatic field, and optical distortion of the optical image capturing system in the order from left to right of the third embodiment of the present application.
FIG. 3C shows a curve diagram of TV distortion of the optical image capturing system of the third embodiment of the present application.
Figure 3:
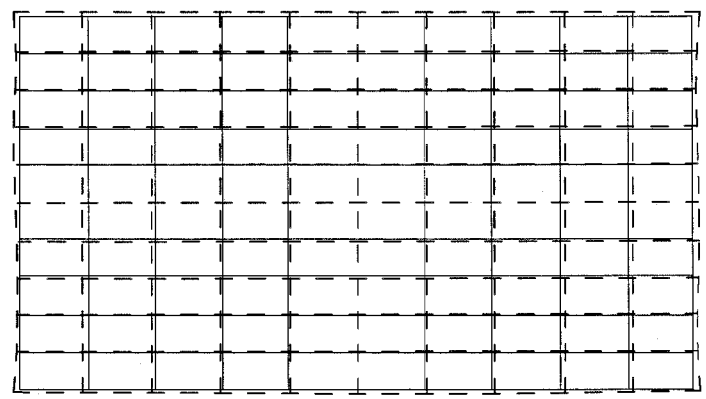

As shown in FIG. 3A and FIG. 3B, an optical image capturing system of the third preferred embodiment of the present invention includes, along an optical axis from an object side to an image side, an aperture 300, a first lens 310, a second lens 320, a third lens 330, a fourth lens 340, a fifth lens 350, an infrared rays filter 370, an image plane 380, and an image sensor 390.

The first lens 310 has positive refractive power, and is made of plastic. An object-side surface 312 thereof, which faces the object side, is a convex aspheric surface, and an image-side surface 314 thereof, which faces the image side, is a concave aspheric surface. The object-side surface 312 and the image-side surface 314 each has an inflection point.

The second lens 320 has negative refractive power, and is made of plastic. An object-side surface 322 thereof, which faces the object side, is a convex aspheric surface, and an image-side surface 324 thereof, which faces the image side, is a concave aspheric surface. The object-side surface 322 and the image-side surface 324 each has an inflection point.

The third lens 330 has positive refractive power, and is made of plastic. An object-side surface 332, which faces the object side, is a convex aspheric surface, and an image-side surface 334 thereof, which faces the image side, is a concave aspheric surface. The object-side surface 332 and the image-side surface 334 each has an inflection point.

The fourth lens 340 has a positive refractive power, and is made of plastic. An object-side surface 342, which faces the object side, is a concave aspheric surface, and an image-side surface 344, which faces the image side, is a convex aspheric surface. The image-side surface 344 has an inflection point.

The fifth lens 350 has negative refractive power, and is made of plastic. An object-side surface 352, which faces the object side, is a convex aspheric surface, and an image-side surface 354, which faces the image side, is a concave aspheric surface. The object-side surface 352 and the image-side surface 354 each has an inflection point.

The infrared rays filter 370 is made of glass, and between the fifth lens 350 and the image plane 380. The infrared rays filter 370 gives no contribution to the focal length of the system.

The parameters of the lenses of the third preferred embodiment are $|f2|+|f3|+|f4|=24.5164$ mm; $|f1|+|f5|=9.7426$ mm; and $|f2|+|f3|+|f4|>|f1|+|f5|$, where f1 is a focal length of the first lens 310; f2 is a focal length of the second lens 320; f3 is a focal length of the third lens 330; and f4 is a focal length of the fourth lens 340; and f5 is a focal length of the fifth lens 350.

The optical image capturing system of the third preferred embodiment further satisfies TP4=0.65276 mm and TP5=0.42186 mm, where TP4 is a thickness of the fourth lens 340 on the optical axis, and TP5 is a thickness of the fifth lens 350 on the optical axis.

In the third embodiment, the first, the third, and the fourth lenses 310, 330, and 340 are positive lenses, and their focal lengths are f1, f3, and f4. ΣPP is a sum of the focal lengths of each positive lens. It is helpful to share the positive refractive power of the first lens 310 to the other positive lenses to avoid the significant aberration caused by the incident rays.

In the third embodiment, the second and the fifth lenses 320 and 350 are negative lenses, and their focal lengths are f2 and f5. ΣNP is a sum of the focal lengths of each negative lens. It is helpful to share the negative refractive power of the fifth lens 350 to the other negative lenses.

The parameters of the lenses of the third embodiment are listed in Table 5 and Table 6.

TABLE 5 f = 2.39718 mm; f/HEP = 1.8; HAF = 49.9999 deg; tan(HAF) = 1.1917

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | infinity | −0.06992 | | | | |
| 2 | 1st lens | 2.18692 | 0.314904 | plastic | 1.565 | 54.5 | 5.90219 |
| 3 | | 5.98456 | 0.303361 | | | | |
| 4 | 2nd lens | 3.51198 | 0.2 | plastic | 1.65 | 21.4 | −12.1643 |
| 5 | | 2.38309 | 0.090275 | | | | |
| 6 | 3rd lens | 5.58675 | 0.577767 | plastic | 1.565 | 58 | 10.1444 |
| 7 | | 189.7979 | 0.215695 | | | | |
| 8 | 4th lens | −2.45147 | 0.652764 | plastic | 1.565 | 58 | 2.20772 |
| 9 | | −0.90824 | 0.05 | | | | |

TABLE 5-continued f = 2.39718 mm; f/HEP = 1.8; HAF = 49.9999 deg; tan(HAF) = 1.1917

| Surface | | Radius of curvature (mm) | Thickness (mm) | Material | Refractive index | Abbe number | Focal length (mm) |
|---|---|---|---|---|---|---|---|
| 10 | 5$^{th}$ lens | 1.01186 | 0.42186 | plastic | 1.65 | 21.4 | −3.84036 |
| 11 | | 0.60259 | 0.7 | | | | |
| 12 | Filter | infinity | 0.2 | | 1.517 | 64.2 | |
| 13 | | infinity | 0.330499 | | | | |
| 14 | Image plane | infinity | | | | | |

Reference wavelength: 555 nm.

TABLE 6

Coefficients of the aspheric surfaces

| Surface | 2 | 3 | 4 | 5 | 6 |
|---|---|---|---|---|---|
| k   | −26.350272   | −17.489157   | 13.01426    | −19.801732  | −1.734065  |
| A4  | 2.67349E−01  | −4.57997E−02 | −2.56216E−01| −3.52362E−02| −1.37493E−01|
| A6  | −5.53953E−01 | −2.34781E−01 | −2.48564E−02| 2.92150E−03 | 1.89278E−01|
| A8  | 6.98444E−01  | 5.43736E−01  | −1.97287E−01| −1.26932E−01| −1.31261E−01|
| A10 | −5.43333E−01 | −1.04531E+00 | −8.38614E−02| 1.17150E−01 | 4.75596E−02|
| A12 | −2.63851E−06 | 5.62774E−02  | −1.37194E−02| −2.85024E−02| −4.31527E−03|
| A14 | −3.44067E−06 | −2.62499E−07 | 1.17763E−04 | −6.03729E−03| −1.65061E−03|

| Surface | 7 | 8 | 9 | 10 | 11 |
|---|---|---|---|---|---|
| k   | −50          | −28.152217   | −2.25509    | −4.731395   | −3.136571 |
| A4  | −4.38314E−02 | −1.97259E−02 | −5.95402E−02| −6.84783E−02| −6.57360E−02|
| A6  | −2.41933E−02 | −3.56832E−02 | −1.89971E−03| −1.11597E−02| 8.04560E−03|
| A8  | 2.63258E−02  | 2.80783E−02  | −1.21582E−02| 1.53746E−03 | −5.32614E−04|
| A10 | −4.45962E−03 | 7.65190E−03  | −6.63077E−04| −4.76961E−03| 2.86538E−05|
| A12 | −2.92652E−02 | −2.61612E−02 | 9.30398E−03 | 3.96073E−03 | 3.05329E−06|
| A14 | 1.17027E−02  | 5.96716E−03  | −1.90606E−03| −8.40673E−04| −3.06993E−06|

An equation of the aspheric surfaces of the third embodiment is the same as that of the first embodiment, and the definitions are the same as well.

Third embodiment (Reference wavelength: 555 nm)

| InRS11 | InRS12 | InRS21 | InRS22 | InRS31 | InRS32 |
|---|---|---|---|---|---|
| 0.10224 | −0.00856 | −0.10343 | 0.02852 | 0.08127 | −0.29656 |

| InRS41 | InRS42 | InRS51 | InRS52 | HVT51 | HVT52 |
|---|---|---|---|---|---|
| −0.40613 | −0.83998 | −0.20093 | −0.00528 | 1.10115 | 1.58245 |

| |ODT|% | |TDT|% | InRSO | InRSI | Σ|InRS| |
|---|---|---|---|---|
| 2.02923 | 1.03913 | 0.89399 | 1.17890 | 2.07289 |

| Σ|InRS|/ InTL | Σ|InRS|/ HOS | (|InRS32| + |InRS41|)/IN34 | (|InRS42| + |InRS51|)/IN45 |
|---|---|---|---|
| 0.73334 | 0.51093 | 3.2578 | 20.8181 |

| (|InRS41| + |InRS42| + |InRS51| + |InRS52|)/ InTL | (|InRS41| + |InRS42| + |InRS51| + |InRS52|)/ HOS |
|---|---|

Third embodiment (Reference wavelength: 555 nm)

| InTL | | | | HOS | |
|---|---|---|---|---|---|
| 0.51380 | | | | 0.35797 | |
| |f/f1| | |f/f2| | |f/f3| | |f/f4| | |f/f5| | |f1/f2| |
| 0.40615 | 0.19707 | 0.23631 | 1.08582 | 0.62421 | 0.48521 |
| ΣPPR | ΣNPR | ΣPPR/ |ΣNPR| | ΣPP | ΣNP | f1/ΣPP |
| 1.72827 | 0.82127 | 2.10438 | 18.25431 | −16.00466 | 0.32333 |
| f5/ΣNP | IN12/f | HVT52/ HOI | HVT52/ HOS | |InRS51|/ TP5 | |InRS52|/ TP5 |
| 0.23995 | 0.12655 | 0.53944 | 0.39004 | 0.4763 | 0.0125 |
| HOS | InTL | HOS/HOI | InS/HOS | InTL/HOS | ΣTP/InTL |
| 4.05712 | 2.82663 | 1.38303 | 0.98277 | 0.69671 | 0.76674 |
| HVT41 | HVT42 | | | | |
| 0 | 0 | | | | |

Third embodiment (Reference wavelength: 555 nm)

| HIF111 | 0.62397 | HIF111/HOI | 0.21271 | SGI111 | 0.08375 | |SGI111|/(|SGI111| + TP1) | 0.21009 |
|---|---|---|---|---|---|---|---|
| HIF121 | 0.36506 | HIF121/HOI | 0.12444 | SGI121 | 0.00973 | |SGI121|/(|SGI121| + TP1) | 0.02997 |
| HIF211 | 0.32389 | HIF211/HOI | 0.11041 | SGI211 | 0.01254 | |SGI211|/(|SGI211| + TP2) | 0.05898 |
| HIF221 | 0.49738 | HIF221/HOI | 0.16955 | SGI221 | 0.04171 | |SGI221|/(|SGI221| + TP2) | 0.17257 |
| HIF311 | 1.17242 | HIF311/HOI | 0.39967 | SGI311 | 0.07422 | |SGI311|/(|SGI311| + TP3) | 0.11383 |

-continued

Third embodiment (Reference wavelength: 555 nm)

| HIF321 | 0.09944 | HIF321/HOI | 0.03390 | SGI321 | 0.00002 | |SGI321|/(|SGI321| + TP3) | 0.00004 |
| HIF421 | 1.14184 | HIF421/HOI | 0.38924 | SGI421 | −0.63590 | |SGI421|/(|SGI421| + TP4) | 0.49346 |
| HIF511 | 0.57187 | HIF511/HOI | 0.19494 | SGI511 | 0.12259 | |SGI511|/(|SGI511| + TP5) | 0.22516 |
| HIF521 | 0.62731 | HIF521/HOI | 0.21384 | SGI521 | 0.22180 | |SGI521|/(|SGI521| + TP5) | 0.34460 |

Fourth Embodiment

Figure 4A:
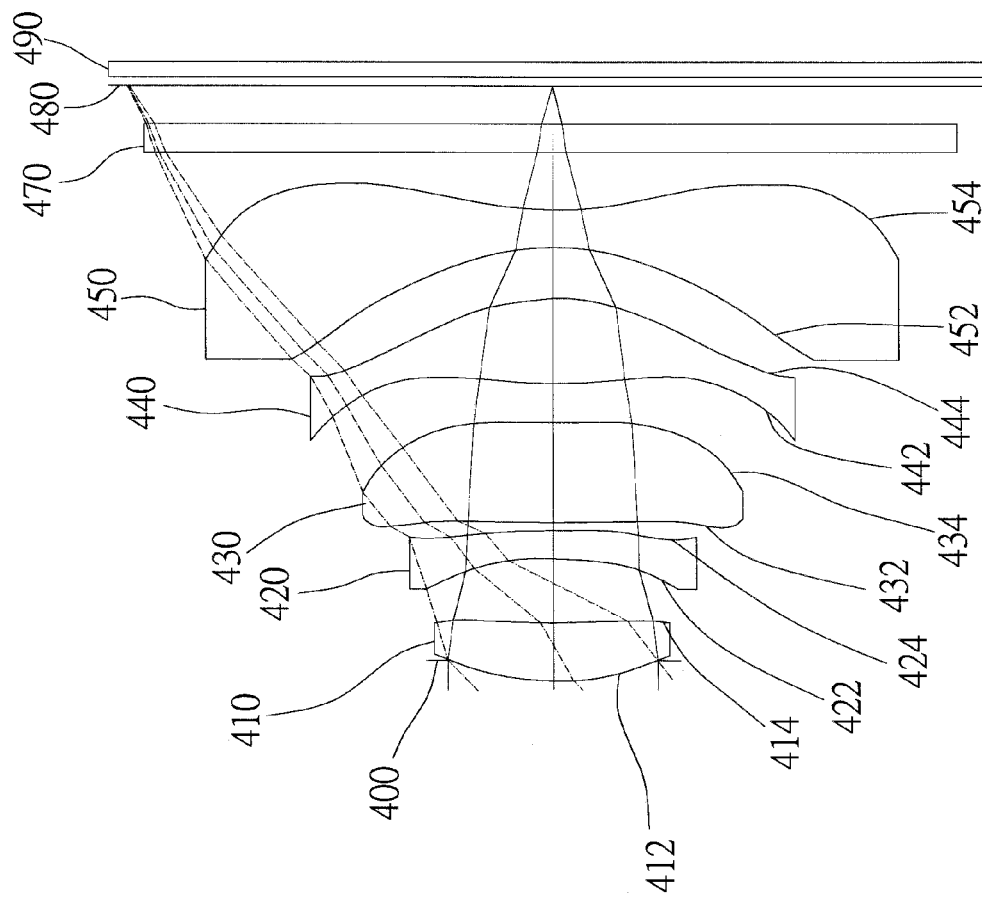
FIG. 4A is a schematic diagram of a fourth preferred embodiment of the present invention.
Figure 4:
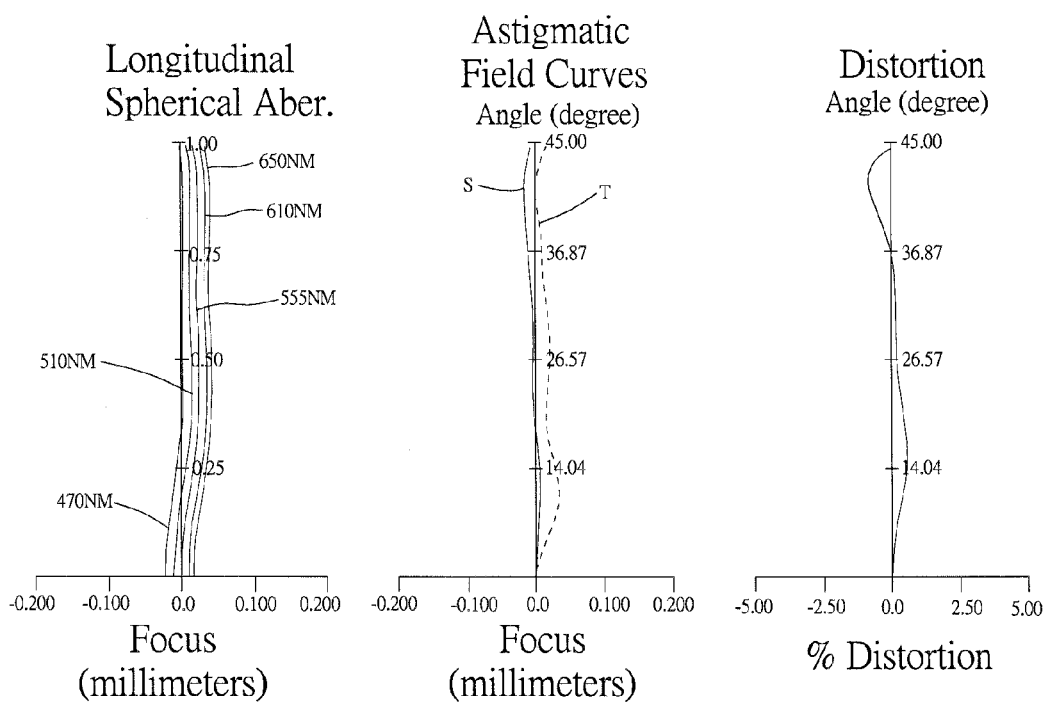
FIG. 4B shows curve diagrams of longitudinal spherical aberration, astigmatic field, and optical distortion of the optical image capturing system in the order from left to right of the fourth embodiment of the present application.
FIG. 4C shows a curve diagram of TV distortion of the optical image capturing system of the fourth embodiment of the present application.
Figure 4:
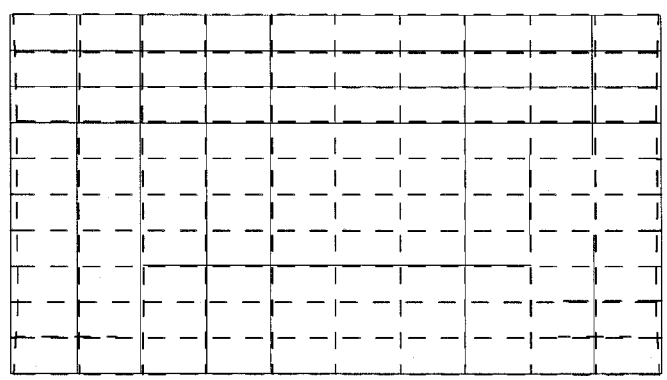

As shown in FIG. 4A and FIG. 4B, an optical image capturing system of the fourth preferred embodiment of the present invention includes, along an optical axis from an object side to an image side, an aperture 400, a first lens 410, a second lens 420, a third lens 430, a fourth lens 440, a fifth lens 450, an infrared rays filter 470, an image plane 480, and an image sensor 490.

The first lens 410 has positive refractive power, and is made of plastic. An object-side surface 412 thereof, which faces the object side, is a convex aspheric surface, and an image-side surface 414 thereof, which faces the image side, is a concave aspheric surface. The object-side surface 412 and the image-side surface 414 each has an inflection point.

The second lens 420 has negative refractive power, and is made of plastic. An object-side surface 422 thereof, which faces the object side, is a concave aspheric surface, and an image-side surface 424 thereof, which faces the image side, is a convex aspheric surface. The object-side surface 422 and the image-side surface 424 each has an inflection point.

The third lens 430 has positive refractive power, and is made of plastic. An object-side surface 432 thereof, which faces the object side, is a convex aspheric surface, and an image-side surface 434 thereof, which faces the image side, is a concave aspheric surfaces. The object-side surface 432 has two inflection points, and the image-side surface 434 has an inflection point.

The fourth lens 440 has positive refractive power, and is made of plastic. An object-side surface 442, which faces the object side, is a convex aspheric surface, and an image-side surface 444, which faces the image side, is a convex aspheric surface. The object-side surface 442 and the image-side surface 444 each has an inflection point.

The fifth lens 450 has negative refractive power, and is made of plastic. An object-side surface 452 thereof, which faces the object side, is a concave aspheric surface, and an image-side surface 454 thereof, which faces the image side, is a concave aspheric surface. The object-side surface 452 and the image-side surface 454 each has an inflection point.

The infrared rays filter 470 is made of glass, and between the fifth lens 450 and the image plane 480. The infrared rays filter 470 gives no contribution to the focal length of the system.

The optical image capturing system of the fourth preferred embodiment has the following parameters, which are |f2|+|f3|+|f4|=39.4651 mm; |f1|+|f5|=5.3625 mm; and |f2+|f3|+|f4|>|f1+|f5|, where f1 is a focal length of the first lens 410; f2 is a focal length of the second lens 420; f3 is a focal length of the third lens 430; f4 is a focal length of the fourth lens 440; and f5 is a focal length of the fifth lens 450.

The optical image capturing system of the fourth preferred embodiment further satisfies TP4=0.60395 mm and TP5=0.26344 mm, where TP4 is a thickness of the fourth lens 340 on the optical axis, and TP5 is a thickness of the fifth lens 350 on the optical axis.

In the fourth embodiment, the first, the third, and the fourth lenses 410, 430, and 440 are positive lenses, and their focal lengths are f1, f3, and f4. ΣPP is a sum of the focal lengths of each positive lens. It is helpful to share the positive refractive power of the first lens 410 to the other positive lenses to avoid the significant aberration caused by the incident rays.

In the fourth embodiment, the second and the fifth lenses 420 and 450 are negative lenses, and their focal lengths are f2 and f5. ΣNP is a sum of the focal lengths of each negative lens. It is helpful to share the negative refractive power of the fifth lens 450 to the other negative lenses.

The parameters of the lenses of the fourth embodiment are listed in Table 7 and Table 8.

TABLE 7 f = 2.91605 mm; f/HEP = 2.0; HAF = 45 deg; tan(HAF) = 1.0

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | infinity | −0.14708 | | | | |
| 2 | 1st lens | 1.69124 | 0.41499 | plastic | 1.565 | 58 | 3.86627 |
| 3 | | 6.75306 | 0.453858 | | | | |
| 4 | 2nd lens | −2.46628 | 0.2 | plastic | 1.65 | 21.4 | −7.7817 |
| 5 | | −4.9287 | 0.05 | | | | |
| 6 | 3rd lens | 11.87603 | 0.706503 | plastic | 1.565 | 58 | 30.0348 |
| 7 | | 38.43269 | 0.267755 | | | | |
| 8 | 4th lens | 2.8635 | 0.603949 | plastic | 1.583 | 30.2 | 1.6486 |
| 9 | | −1.34596 | 0.354493 | | | | |
| 10 | 5th lens | −1.67479 | 0.263444 | plastic | 1.607 | 26.6 | −1.49619 |
| 11 | | 2.13382 | 0.4 | | | | |
| 12 | Filter | infinity | 0.2 | | 1.517 | 64.2 | |
| 13 | | infinity | 0.269666 | | | | |

TABLE 7-continued f = 2.91605 mm; f/HEP = 2.0; HAF = 45 deg; tan(HAF) = 1.0

| Surface | Radius of curvature (mm) | Thickness (mm) | Material | Refractive index | Abbe number | Focal length (mm) |
|---|---|---|---|---|---|---|
| 14 | Image plane | infinity | | | | |

Reference wavelength: 555 nm.

TABLE 8

Coefficients of the aspheric surfaces

| Surface | 2 | 3 | 4 | 5 | 6 |
|---|---|---|---|---|---|
| k   | −4.473104    | 24.458806    | −0.137984    | 18.217521    | −50          |
| A4  | 1.01096E−01  | −2.80985E−02 | −1.07115E−01 | −2.22862E−02 | −6.82118E−02 |
| A6  | 5.76964E−03  | −2.20494E−01 | 6.94897E−02  | 7.00150E−02  | 2.95183E−02  |
| A8  | −2.21606E−01 | 5.06050E−01  | −4.39580E−01 | −3.92556E−02 | −7.28288E−03 |
| A10 | 3.36469E−01  | −9.75936E−01 | 7.54623E−01  | 6.25378E−02  | 1.15888E−03  |
| A12 | −2.97105E−01 | 5.48066E−01  | −6.63314E−01 | 5.53065E−02  | −1.90415E−02 |
| A14 | 3.15471E−08  | −2.84479E−07 | 3.85196E−01  | −3.63798E−02 | 1.25974E−02  |

| Surface | 7 | 8 | 9 | 10 | 11 |
|---|---|---|---|---|---|
| k   | −50          | −29.02954    | −2.773164    | −0.245173    | −10.765583   |
| A4  | −1.96057E−01 | −5.75654E−02 | −4.65861E−03 | 4.37253E−02  | −3.32128E−02 |
| A6  | 5.87036E−02  | −3.13976E−02 | 1.19570E−03  | 5.76501E−03  | 5.08087E−03  |
| A8  | −3.46701E−02 | 8.05427E−03  | 2.63363E−03  | −2.02257E−03 | −7.66976E−04 |
| A10 | 2.23303E−03  | 1.20769E−03  | 4.55600E−04  | −4.39056E−04 | 7.08598E−06  |
| A12 | 8.35114E−03  | 3.91485E−04  | −8.89822E−06 | 1.41597E−04  | 3.37343E−06  |
| A14 | −4.19138E−03 | −2.91504E−04 | −5.74697E−05 | 5.18647E−05  | −6.48571E−07 |

An equation of the aspheric surfaces of the fourth embodiment is the same as that of the first embodiment, and the definitions are the same as well.

Fourth embodiment (Reference wavelength: 555 nm)

| InRS11 | InRS12 | InRS21 | InRS22 | InRS31 | InRS32 |
|---|---|---|---|---|---|
| 0.16329 | −0.00147 | −0.21653 | −0.05165 | −0.02903 | −0.50005 |
| InRS41 | InRS42 | InRS51 | InRS52 | HVT51 | HVT52 |
| −0.22627 | −0.56060 | −0.79034 | −0.34666 | 0.00000 | 1.45100 |
| |ODT|% | |TDT|% | InRSO | InRSI | Σ|InRS| | |
| 0.82693 | 1.01512 | 1.42546 | 1.46042 | 2.88588 | |
| Σ|InRS|/InTL | Σ|InRS|/HOS | (|InRS32| + |InRS41|)/IN34 | (|InRS42| + |InRS51|)/IN45 | | |
| 0.87056 | 0.68963 | 2.7126 | 3.8109 | | |

-continued

Fourth embodiment (Reference wavelength: 555 nm)

| (|InRS41| + |InRS42| + |InRS51| + |InRS52|)/InTL | | | (|InRS41| + |InRS42| + |InRS51| + |InRS52|)/HOS | | |
|---|---|---|---|---|---|
| 0.58036 | | | 0.45974 | | |
| |f/f1| | |f/f2| | |f/f3| | |f/f4| | |f/f5| | |f1/f2| |
| 0.75423 | 0.37473 | 0.09709 | 1.76880 | 1.94898 | 0.49684 |
| ΣPPR | ΣNPR | ΣPPR/|ΣNPR| | ΣPP | ΣNP | f1/ΣPP |
| 2.62012 | 2.32372 | 1.12756 | 35.54967 | −9.27789 | 0.10876 |
| f5/ΣNP | IN12/f | HVT52/HOI | HVT52/HOS | |InRS51|/TP5 | |InRS52|/TP5 |
| 0.16126 | 0.15564 | 0.49463 | 0.34674 | 3.0000 | 1.3159 |
| HOS | InTL | HOS/HOI | InS/HOS | InTL/HOS | ΣTP/InTL |
| 4.18466 | 3.31499 | 1.42651 | 0.96485 | 0.79218 | 0.66030 |
| HVT41 | HVT42 | | | | |
| 0.787242 | 0 | | | | |

Fourth embodiment (Reference wavelength: 555 nm)

| HIF111 | 0.71414 | HIF111/HOI | 0.24344 | SGI111 | 0.15115 | |SGI111|/(|SGI111| + TP1) | 0.26698 |
|---|---|---|---|---|---|---|---|
| HIF121 | 0.41201 | HIF121/HOI | 0.14045 | SGI121 | 0.01129 | |SGI121|/(|SGI121| + TP1) | 0.02648 |
| HIF211 | 0.80340 | HIF211/HOI | 0.27387 | SGI211 | −0.18168 | |SGI211|/(|SGI211| + TP2) | 0.47599 |
| HIF221 | 0.66346 | HIF221/HOI | 0.22617 | SGI221 | −0.04792 | |SGI221|/(|SGI221| + TP2) | 0.19328 |
| HIF311 | 0.33103 | HIF311/HOI | 0.11285 | SGI311 | 0.00379 | |SGI311|/(|SGI311| + TP3) | 0.00533 |
| HIF312 | 1.06477 | HIF312/HOI | 0.36297 | SGI312 | −0.02085 | |SGI312|/(|SGI312| + TP3) | 0.02867 |
| HIF321 | 0.10561 | HIF321/HOI | 0.03600 | SGI321 | 0.00012 | |SGI321|/(|SGI321| + TP3) | 0.00017 |

-continued

| Fourth embodiment (Reference wavelength: 555 nm) | | | | | | |
|---|---|---|---|---|---|---|
| HIF411 | 0.43800 | HIF411/HOI | 0.14931 | SGI411 | 0.02697 | \|SGI411\|/(\|SGI411\| + TP4) | 0.04274 |
| HIF421 | 1.06551 | HIF421/HOI | 0.36322 | SGI421 | −0.34304 | \|SGI421\|/(\|SGI421\| + TP4) | 0.36225 |
| HIF511 | 1.57813 | HIF511/HOI | 0.53797 | SGI511 | −0.63960 | \|SGI511\|/(\|SGI511\| + TP5) | 0.70827 |
| HIF521 | 0.69444 | HIF521/HOI | 0.23673 | SGI521 | 0.08595 | \|SGI521\|/(\|SGI521\| + TP5) | 0.24600 |

Fifth Embodiment

Figure 5A:
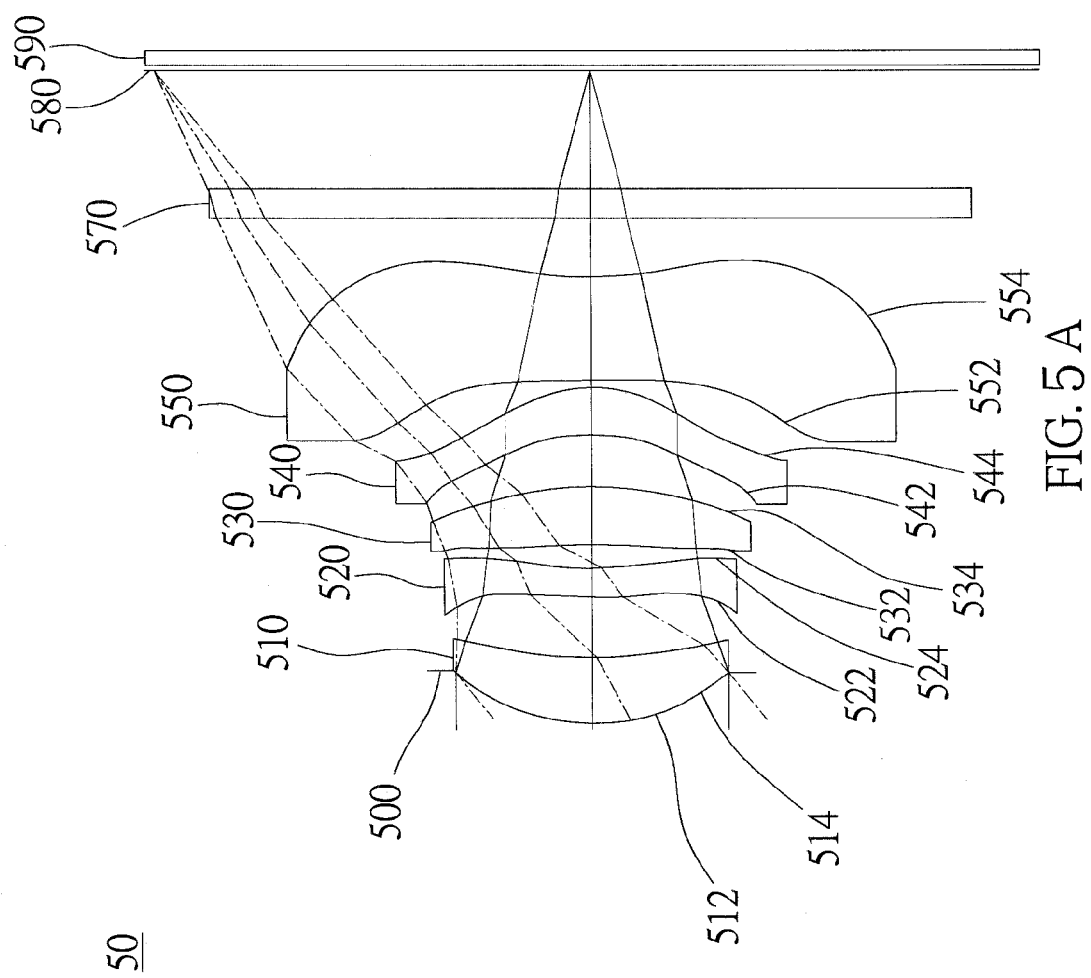
FIG. 5A is a schematic diagram of a fifth preferred embodiment of the present invention.
Figure 5:
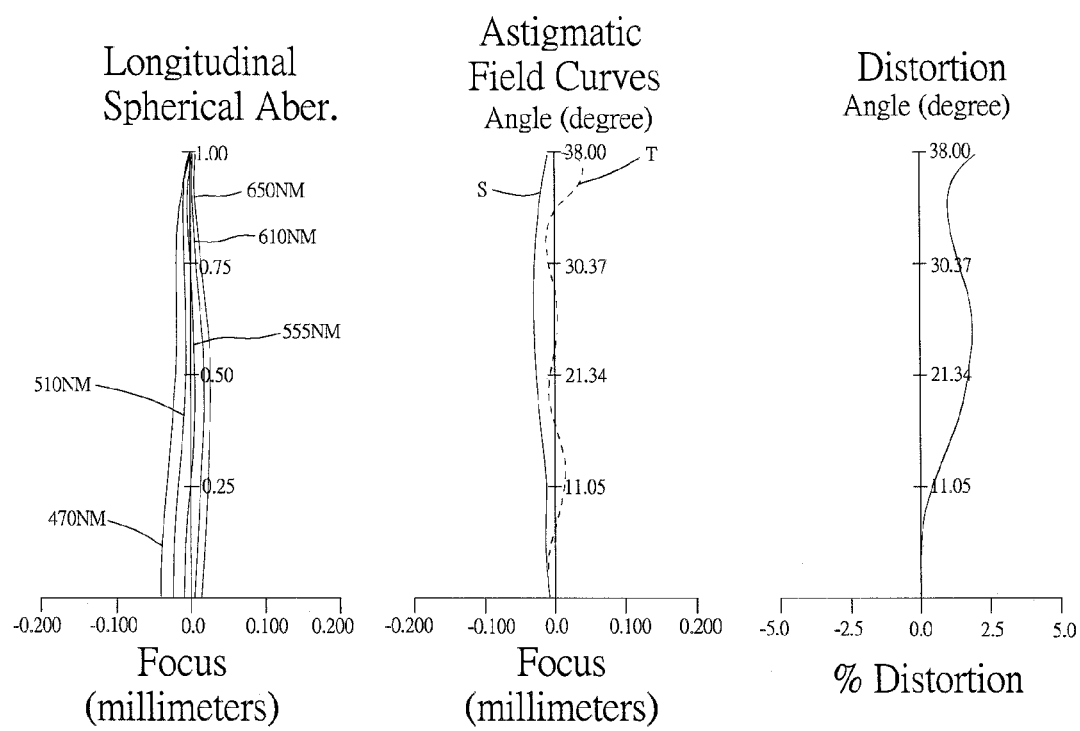
FIG. 5B shows curve diagrams of longitudinal spherical aberration, astigmatic field, and optical distortion of the optical image capturing system in the order from left to right of the fifth embodiment of the present application.
FIG. 5C shows a curve diagram of TV distortion of the optical image capturing system of the fifth embodiment of the present application.
Figure 5:
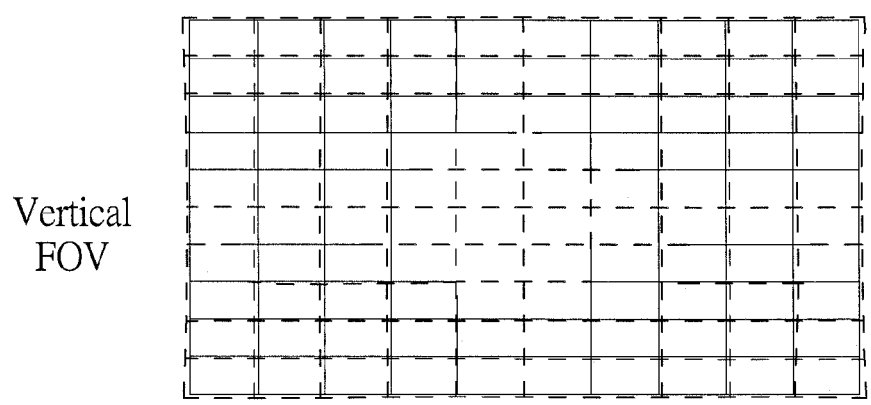

As shown in FIG. 5A and FIG. 5B, an optical image capturing system of the fifth preferred embodiment of the present invention includes, along an optical axis from an object side to an image side, an aperture 500, a first lens 510, a second lens 520, a third lens 530, a fourth lens 540, a fifth lens 550, an infrared rays filter 570, an image plane 580, and an image sensor 590.

The first lens 510 has positive refractive power, and is made of plastic. An object-side surface 512 thereof, which faces the object side, is a convex aspheric surface, and an image-side surface 514 thereof, which faces the image side, is a concave aspheric surface. The image-side surface 5142 has an inflection point.

The second lens 520 has negative refractive power, and is made of plastic. An object-side surface 522 thereof, which faces the object side, is a convex aspheric surface, and an image-side surface 524 thereof, which faces the image side, is a concave aspheric surface. The object-side surface 522 and the image-side surface 524 each has an inflection point.

The third lens 530 has positive refractive power, and is made of plastic. An object-side surface 532 thereof, which faces the object side, is a concave aspheric surface, and an image-side surface 534 thereof, which faces the image side, is a convex aspheric surface. The object-side surface 532 has two inflection points.

The fourth lens 540 has a positive refractive power, and is made of plastic. An object-side surface 542, which faces the object side, is a concave aspheric surface, and an image-side surface 544, which faces the image side, is a convex aspheric surface. The the image-side surface 544 has an inflection point.

The fifth lens 550 has negative refractive power, and is made of plastic. An object-side surface 552 thereof, which faces the object side, is a concave aspheric surface, and an image-side surface 554 thereof, which faces the image side, is a concave aspheric surface. The object-side surface 552 and the image-side surface 554 each has an inflection point.

The infrared rays filter 570 is made of glass, and between the fifth lens 550 and the image plane 580. The infrared rays filter 570 gives no contribution to the focal length of the system.

The parameters of the lenses of the fifth preferred embodiment are |f2|+|f3|+|f4|=23.0849 mm; |f1|+|f5|=6.6911 mm; and |f2|+|f3|+|f4|>|f1|+|f5|, where f1 is a focal length of the first lens 510; f2 is a focal length of the second lens 520; f3 is a focal length of the third lens 530; and f4 is a focal length of the fourth lens 540; and f5 is a focal length of the fifth lens 550.

The optical image capturing system of the fifth preferred embodiment further satisfies TP4=0.32126 mm and TP5=0.70101 mm, where TP4 is a thickness of the fourth lens 540 on the optical axis, and TP5 is a thickness of the fifth lens 550 on the optical axis.

In the fifth preferred embodiment, the first, the third, and the fourth lenses 510, 530, and 540 are positive lenses, and their focal lengths are f1, f3, and f4. ΣPP is a sum of the focal lengths of each positive lens. It is helpful to share the positive refractive power of the first lens 510 to the other positive lenses to avoid the significant aberration caused by the incident rays.

In the fifth preferred embodiment, the second and the fifth lenses 520 and 550 are negative lenses, and their focal lengths are f2 and f5. ΣNP is a sum of the focal lengths of each negative lens. It is helpful to share the negative refractive power of the fifth lens 550 to the other negative lenses to avoid the significant aberration caused by the incident rays.

The parameters of the lenses of the fifth embodiment are listed in Table 9 and Table 10.

TABLE 9 f = 3.67459 mm; f/HEP = 2.0; HAF = 38 deg; tan(HAF) = 0.7813

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | infinity | −0.34879 | | | | |
| 2 | 1st lens | 1.43216 | 0.450229 | plastic | 1.565 | 58 | 4.05701 |
| 3 | | 3.36533 | 0.407684 | | | | |
| 4 | 2nd lens | 2.92369 | 0.2 | plastic | 1.65 | 21.4 | −13.8171 |
| 5 | | 2.15031 | 0.158125 | | | | |
| 6 | 3rd lens | −7.11521 | 0.399858 | plastic | 1.565 | 58 | 5.4417 |
| 7 | | −2.19533 | 0.353613 | | | | |
| 8 | 4th lens | −1.08928 | 0.321259 | plastic | 1.65 | 21.4 | 3.82609 |
| 9 | | −0.8481 | 0.051529 | | | | |

TABLE 9-continued f = 3.67459 mm; f/HEP = 2.0; HAF = 38 deg; tan(HAF) = 0.7813

| Surface | | Radius of curvature (mm) | Thickness (mm) | Material | Refractive index | Abbe number | Focal length (mm) |
|---|---|---|---|---|---|---|---|
| 10 | $5^{th}$ lens | −21.7646 | 0.701014 | plastic | 1.583 | 30.2 | −2.63409 |
| 11 | | | 1.68269 | | | | |
| | | | 0.4 | | | | |
| 12 | Filter | infinity | 0.2 | | 1.517 | 64.2 | |
| 13 | | infinity | 0.806688 | | | | |
| 14 | Image plane | infinity | | | | | |

Reference wavelength: 555 nm

TABLE 10

| Coefficients of the aspheric surfaces | | | | | |
|---|---|---|---|---|---|
| Surface | 2 | 3 | 4 | 5 | 6 |
| k | −1.067567 | 2.712622 | 3.652068 | −8.310812 | 50 |
| A4 | 4.73563E−02 | −2.46026E−02 | −2.72545E−01 | −8.16290E−02 | 3.33527E−02 |
| A6 | 3.49883E−02 | −5.92297E−03 | −1.63795E−01 | −1.76397E−01 | 7.61744E−02 |
| A8 | −2.34271E−02 | 1.42541E−02 | 1.34716E−01 | 2.53267E−01 | 1.51809E−01 |
| A10 | 3.92453E−02 | 9.64446E−03 | −2.70613E−02 | −1.52742E−01 | −3.81139E−01 |
| A12 | −9.50716E−03 | −2.54711E−02 | 2.99583E−03 | 4.07905E−02 | 2.54669E−01 |
| A14 | −2.01834E−04 | −1.25184E−03 | −6.26588E−03 | −3.85391E−03 | −5.46628E−02 |
| Surface | 7 | 8 | 9 | 10 | 11 |
| k | −7.670413 | −1.402178 | −2.309436 | 50 | −16.040482 |
| A4 | −1.14455E−01 | −2.37616E−02 | −4.59722E−02 | −7.80117E−02 | −7.52589E−02 |
| A6 | 1.41057E−01 | 3.05639E−01 | 7.32103E−02 | −3.56839E−02 | 1.72118E−02 |
| A8 | 7.18175E−02 | −2.64420E−01 | 2.48680E−02 | 1.26627E−02 | −4.61544E−03 |
| A10 | −1.71726E−01 | 8.70070E−02 | −1.36417E−02 | 4.43197E−03 | 2.67273E−04 |
| A12 | 1.50433E−02 | −2.06385E−02 | −1.20705E−02 | −3.24261E−04 | 1.19915E−04 |
| A14 | 2.88146E−02 | −1.35150E−02 | 5.30182E−03 | −2.65800E−04 | −2.55056E−05 |

An equation of the aspheric surfaces of the fifth embodiment is the same as that of the first embodiment, and the definitions are the same as well.

| Fifth embodiment (Reference wavelength: 555 nm) | | | | | |
|---|---|---|---|---|---|
| InRS11 | InRS12 | InRS21 | InRS22 | InRS31 | InRS32 |
| 0.34879 | 0.11280 | −0.06034 | 0.06207 | −0.04296 | −0.24282 |
| InRS41 | InRS42 | InRS51 | InRS52 | HVT51 | HVT52 |
| −0.47045 | −0.49646 | −0.42121 | −0.62235 | 0.00000 | 1.00976 |
| |ODT|% | |TDT|% | InRSO | InRSI | Σ|InRS| | |
| 2.00001 | 1.00379 | 1.34375 | 1.53649 | 2.88024 | |
| Σ|InRS|/ InTL | Σ|InRS|/ HOS | (|InRS32| + |InRS41|)/IN34 | | (|InRS42| + |InRS51|)/IN45 | |
| 0.94642 | 0.64725 | 2.0171 | | 17.8087 | |

-continued

| Fifth embodiment (Reference wavelength: 555 nm) | | | | | |
|---|---|---|---|---|---|
| (|InRS41| + |InRS42| + |InRS51| + |InRS52|)/ InTL | | | (|InRS41| + |InRS42| + |InRS51| + |InRS52|)/ HOS | | |
| 0.66062 | | | 0.45179 | | |
| |f/f1| | |f/f2| | |f/f3| | |f/f4| | |f/f5| | |f1/f2| |
| 0.90574 | 0.26595 | 0.67527 | 0.96040 | 1.39501 | 0.29362 |
| ΣPPR | ΣNPR | ΣPPR/ |ΣNPR| | ΣPP | ΣNP | f1/ΣPP |
| 2.54141 | 1.66096 | 1.53008 | 13.32480 | −16.45119 | 0.30447 |
| f5/ΣNP | IN12/f | HVT52/ HOI | HVT52/ HOS | |InRS51|/ |InRS52|/ TP5 | |InRS52|/ TP5 |
| 0.16012 | 0.11095 | 0.34422 | 0.22691 | 0.6009 | 0.8878 |
| HOS | InTL | HOS/HOI | InS/HOS | InTL/HOS | ΣTP/InTL |
| 4.45000 | 3.04331 | 1.51696 | 0.92162 | 0.68389 | 0.68096 |
| HVT41 | HVT42 | | | | |
| 0 | 0 | | | | |

| Fifth embodiment (Reference wavelength: 555 nm) | | | | | | |
|---|---|---|---|---|---|---|
| HIF121 | 0.84595 | HIF121/ HOI | 0.28838 | SGI121 | 0.10066 | |SGI121|/ (|SGI121| + TP1) 0.18272 |
| HIF211 | 0.31754 | HIF211/ HOI | 0.10825 | SGI211 | 0.01456 | |SGI211|/ (|SGI211| + TP2) 0.06787 |
| HIF221 | 0.44415 | HIF221/ HOI | 0.151440 | SGI221 | 0.03857 | |SGI221|/ (|SGI221| + TP2) 0.16167 |
| HIF311 | 0.44949 | HIF311/ HOI | 0.15323 | SGI311 | −0.01287 | |SGI311|/ (|SGI311| + TP3) 0.03119 |
| HIF312 | 0.78447 | HIF312/ HOI | 0.26742 | SGI312 | −0.02298 | |SGI312|/ (|SGI312| + TP3) 0.05435 |

-continued

| Fifth embodiment (Reference wavelength: 555 nm) | | | | | | |
|---|---|---|---|---|---|---|
| HIF421 | 0.73879 | HIF421/HOI | 0.25185 | SGI421 | −0.26731 | \|SGI421\|/(\|SGI421\| + TP4) | 0.45417 |
| HIF511 | 1.26997 | HIF511/HOI | 0.43292 | SGI511 | −0.27066 | \|SGI511\|/(\|SGI511\| + TP5) | 0.27855 |
| HIF521 | 0.47646 | HIF521/HOI | 0.16242 | SGI521 | 0.05060 | \|SGI521\|/(\|SGI521\| + TP5) | 0.06732 |

Sixth Embodiment

Figure 6A:
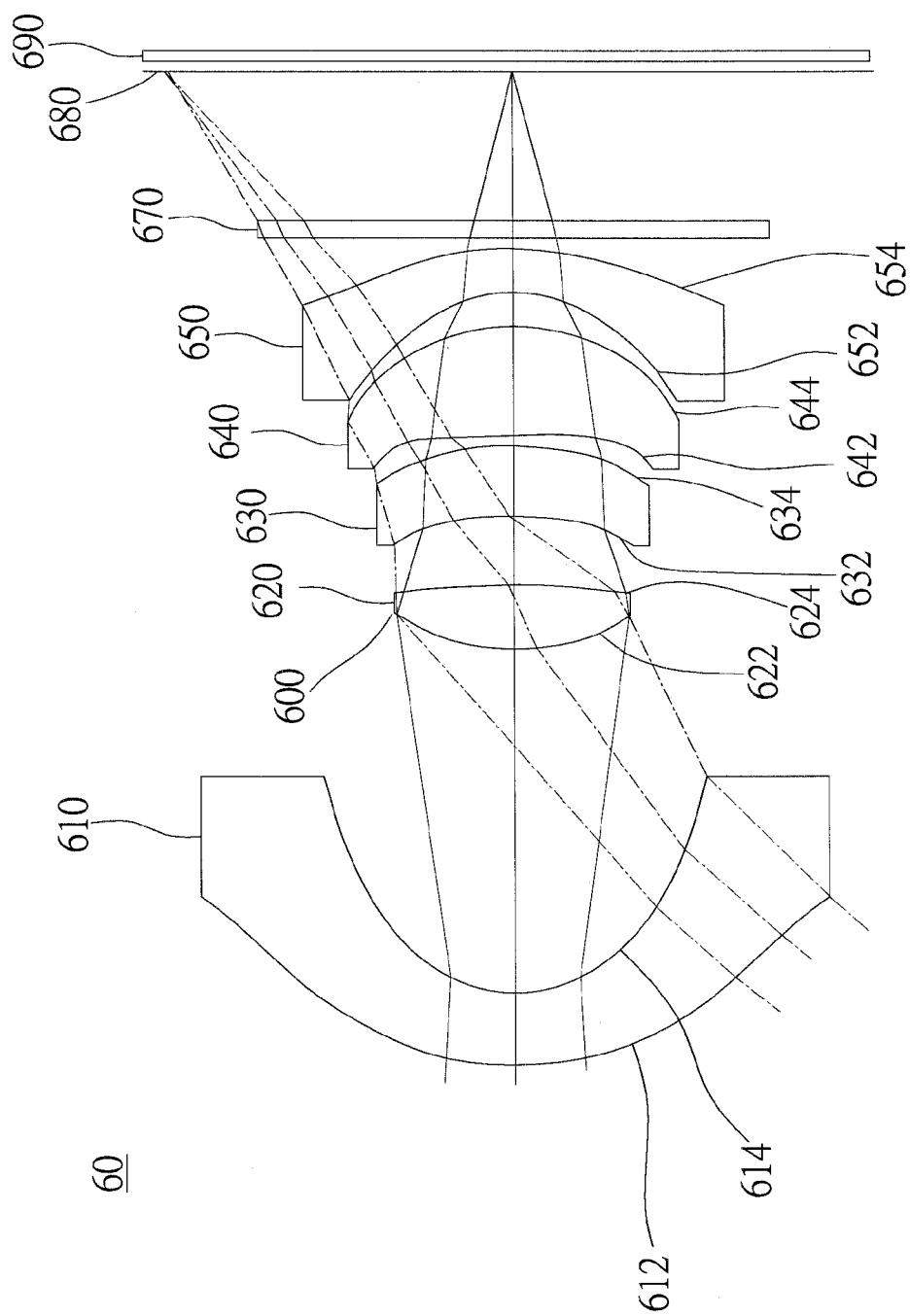
FIG. 6A is a schematic diagram of a sixth preferred embodiment of the present invention.
Figure 6:
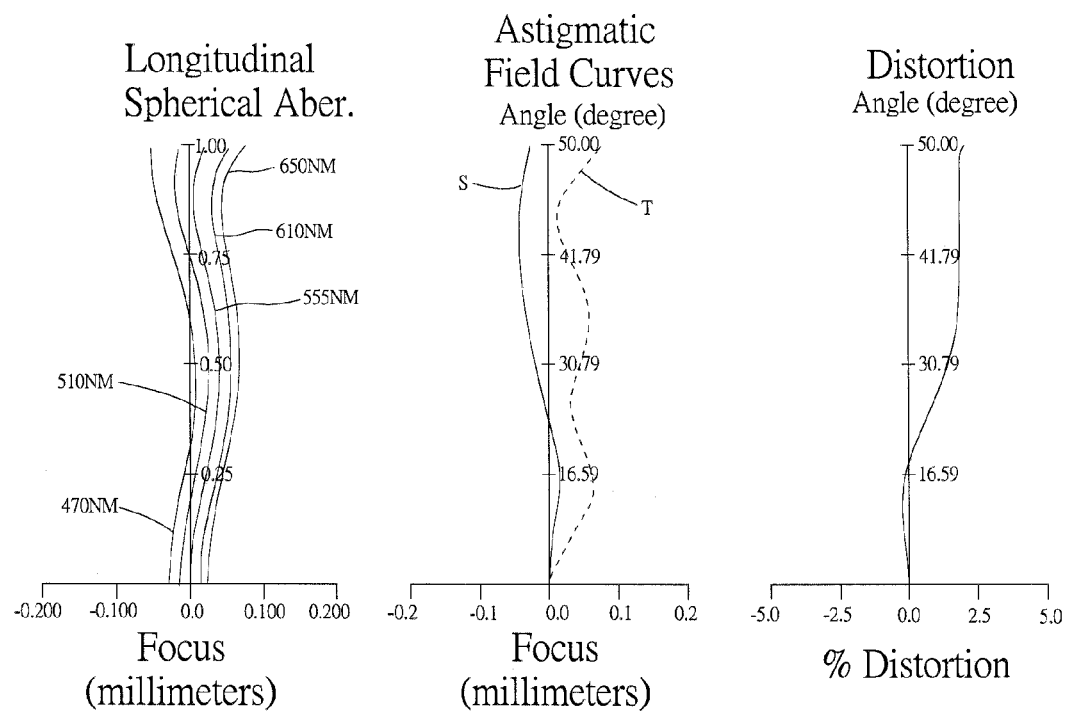
FIG. 6B shows curve diagrams of longitudinal spherical aberration, astigmatic field, and optical distortion of the optical image capturing system in the order from left to right of the sixth embodiment of the present application.
FIG. 6C shows a curve diagram of TV distortion of the optical image capturing system of the sixth embodiment of the present application.
Figure 6:
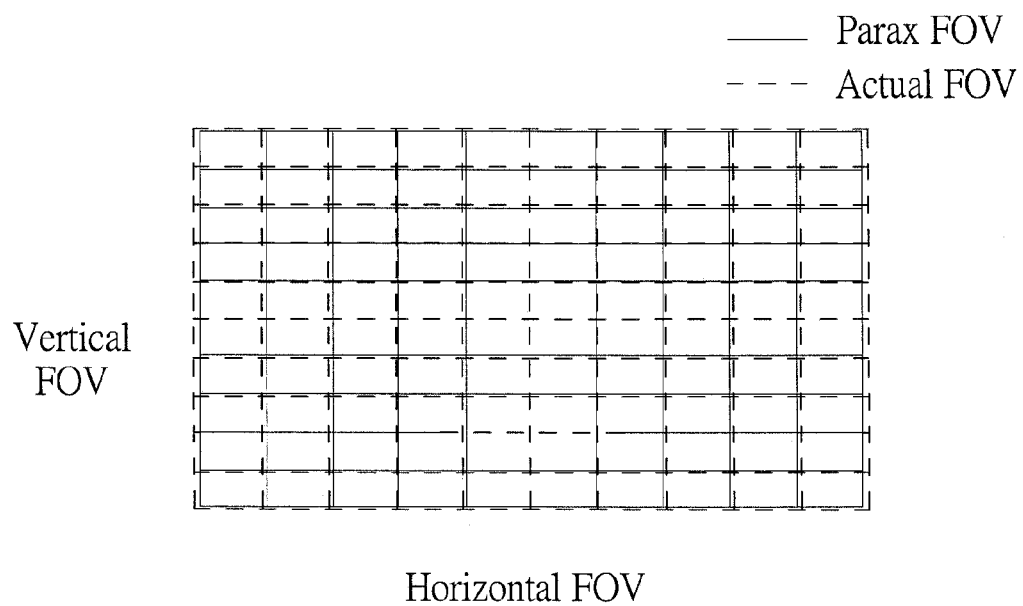

As shown in FIG. 6A and FIG. 6B, an optical image capturing system of the sixth preferred embodiment of the present invention includes, along an optical axis from an object side to an image side, a first lens 610, an aperture 600, a second lens 620, a third lens 630, a fourth lens 640, a fifth lens 650, an infrared rays filter 670, an image plane 680, and an image sensor 690.

The first lens 610 has negative refractive power, and is made of plastic. An object-side surface 612 thereof, which faces the object side, is a convex aspheric surface, and an image-side surface 614 thereof, which faces the image side, is a concave aspheric surface. The object-side surface 612 has an inflection point.

The second lens 620 has positive refractive power, and is made of plastic. An object-side surface 622 thereof, which faces the object side, is a convex aspheric surface, and an image-side surface 624 thereof, which faces the image side, is a convex aspheric surface.

The third lens 630 has positive refractive power, and is made of plastic. An object-side surface 632 thereof, which faces the object side, is a concave aspheric surface, and an image-side surface 634 thereof, which faces the image side, is a convex aspheric surface. The image-side surface 634 has an inflection point.

The fourth lens 640 has a positive refractive power, and is made of plastic. An object-side surface 642, which faces the object side, is a concave aspheric surface, and an image-side surface 644, which faces the image side, is a convex aspheric surface.

The fifth lens 650 has negative refractive power, and is made of plastic. An object-side surface 652 thereof, which faces the object side, is a concave aspheric surface, and an image-side surface 654 thereof, which faces the image side, is a convex aspheric surface. The image-side surface 654 has an inflection point.

The infrared rays filter 670 is made of glass, and between the fifth lens 650 and the image plane 680. The infrared rays filter 670 gives no contribution to the focal length of the system.

The parameters of the lenses of the sixth preferred embodiment are $|f2|+|f3|+|f4|=33.5491$ mm; $|f1|+|f5|=10.9113$ mm; and $|f2|+|f3|+|f4|>|f1|+|f5|$, where f1 is a focal length of the first lens 610; f2 is a focal length of the second lens 620; f3 is a focal length of the third lens 630; and f4 is a focal length of the fourth lens 640; and f5 is a focal length of the fifth lens 650.

The optical image capturing system of the sixth preferred embodiment further satisfies TP4=1.1936 mm and TP5=0.4938 mm, where TP4 is a thickness of the fourth lens 640 on the optical axis, and TP5 is a thickness of the fifth lens 650 on the optical axis.

In the sixth preferred embodiment, the second, the third, and the fourth lenses 620, 630, and 640 are positive lenses, and their focal lengths are f2, f3, and f4. The optical image capturing system of the sixth preferred embodiment further satisfies ΣPP=f2+f3+f4=33.5491 mm and f2/(f2+f3+f4), 0.1012, where ΣPP is a sum of the focal lengths of each positive lens. It is helpful to share the positive refractive power of the second lens 620 to the other positive lenses to avoid the significant aberration caused by the incident rays.

In the sixth preferred embodiment, the first and the fifth lenses 610 and 650 are negative lenses, and their focal lengths are f2 and f4. The optical image capturing system of the sixth preferred embodiment further satisfies ΣNP=f1+f5=−10.9113 mm; and f5/(f1+f5)=0.3956, where ΣNP is a sum of the focal lengths of each negative lens. It is helpful to share the negative refractive power of the fifth lens 650 to the other negative lenses to avoid the significant aberration caused by the incident rays.

The parameters of the lenses of the sixth embodiment are listed in Table 11 and Table 12.

TABLE 11 f = 3.06009 mm; f/HEP = 2.0; HAF = 50.0007 deg; tan(HAF) = 1.1918

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | 3.50904 | 0.796742 | plastic | 1.514 | 56.8 | −6.5946 |
| 2 | 1st lens | 1.59356 | 4.172675 | | | | |
| 3 | | infinity | −0.36597 | | | | |
| 4 | 2nd lens | 2.36495 | 0.703695 | plastic | 1.565 | 58 | 3.39442 |
| 5 | | −9.20538 | 0.766828 | | | | |
| 6 | 3rd lens | −3.96665 | 0.773956 | plastic | 1.565 | 58 | 26.056 |
| 7 | | −3.3475 | 0.128823 | | | | |
| 8 | 4th lens | −19.1128 | 1.193613 | plastic | 1.565 | 58 | 4.09863 |
| 9 | | −2.11807 | 0.384924 | | | | |
| 10 | 5th lens | −1.36773 | 0.49381 | plastic | 1.65 | 21.4 | −4.31667 |
| 11 | | −3.02608 | 0.1 | | | | |
| 12 | Filter | infinity | 0.2 | | 1.517 | 64.2 | |
| 13 | | infinity | 1.623541 | | | | |

TABLE 11-continued f = 3.06009 mm; f/HEP = 2.0; HAF = 50.0007 deg; tan(HAF) = 1.1918

| Surface | Radius of curvature (mm) | Thickness (mm) | Material | Refractive index | Abbe number | Focal length (mm) |
|---|---|---|---|---|---|---|
| 14 | Image plane infinity | 0.027363 | | | | |

Reference wavelength: 555nm

TABLE 12

Coefficients of the aspheric surfaces

| Surface | 1 | 2 | 4 | 5 | 6 |
|---|---|---|---|---|---|
| k  | −0.364446    | −0.797073    | −0.976489    | 45.184506    | −4.955335    |
| A4 | 3.03151E−03  | 2.47474E−02  | 1.19749E−02  | 1.53107E−02  | −3.15766E−02 |
| A6 | 3.11535E−04  | 1.09227E−03  | 3.29173E−03  | −8.86750E−03 | −7.36452E−03 |
| A8 | 6.03641E−06  | 2.11777E−03  | −1.41246E−03 | 1.63700E−02  | 9.93051E−03  |
| A10| −1.90703E−05 | −1.38673E−04 | 2.09487E−03  | −9.72154E−02 | −1.85429E−02 |
| A12| 1.68207E−06  | −2.43097E−05 | −1.07114E−03 | 1.55553E−03  | 8.34169E−03  |
| A14| −4.42840E−08 | 5.42793E−07  | 4.80842E−05  | 4.47459E−04  | −9.07537E−04 |

| Surface | 7 | 8 | 9 | 10 | 11 |
|---|---|---|---|---|---|
| k  | −4.26661     | −17.215386   | 0.01572      | −0.56999     | −1.957095    |
| A4 | −2.02516E−02 | −2.81080E−02 | 1.04073E−02  | 2.87988E−02  | 4.78950E−03  |
| A6 | −1.45844E−02 | 1.26828E−02  | 4.37395E−04  | −1.68233E−04 | −4.65598E−04 |
| A8 | 1.47638E−02  | −2.57367E−02 | −8.83115E−04 | −1.52077E−04 | 1.47492E−04  |
| A10| −8.52821E−03 | 1.81999E−02  | −2.21655E−04 | 2.58158E−05  | −1.37919E−05 |
| A12| −3.64995E−05 | −8.19803E−03 | −4.19162E−05 | −6.96422E−06 | 1.27305E−06  |
| A14| 8.24445E−04  | 1.22153E−03  | 5.89942E−06  | 1.05801E−05  | −1.66946E−07 |

An equation of the aspheric surfaces of the sixth embodiment is the same as that of the first embodiment, and the definitions are the same as well.

Sixth embodiment (Reference wavelength: 555 nm)

| InRS11 | InRS12 | InRS21 | InRS22 | InRS31 | InRS32 |
|---|---|---|---|---|---|
| 1.85151 | 2.39057 | 0.36630 | −0.08200 | −0.32310 | −0.42687 |
| InRS41 | InRS42 | InRS51 | InRS52 | |InRS51|/TP5 | |InRS52|/TP5 |
| −0.37068 | −1.05112 | −1.19340 | −0.63635 | 2.4167 | 1.2887 |
| |ODT|% | |TDT|% | InRSO | InRSI | Σ|InRSI| | |
| 1.99808 | 0.23490 | 4.10499 | 4.58691 | 8.69190 | |
| Σ|InRSI|/InTL | Σ|InRSI|/HOS | (|InRS32| + |InRS41|)/IN34 | | (|InRS42| + |InRS51|)/IN45 | |
| 0.96053 | 0.79017 | 6.19108 | | 5.83107 | |
| (|InRS31| + |InRS32| + |InRS41| + |InRS42|)/ | | | (|InRS31| + |InRS32| + |InRS41| + |InRS42|)/ | | |

Sixth embodiment (Reference wavelength: 555 nm)

| | InTL 0.35932 | | | HOS 0.29560 | |
|---|---|---|---|---|---|
| |f/f1| | |f/f2| | |f/f3| | |f/f4| | |f/f5| | |f1/f2| |
| 0.46403 | 0.90151 | 0.11744 | 0.74661 | 0.70890 | 1.94278 |
| ΣPPR | ΣNPR | ΣPPR/|ΣNPR| | ΣPP | ΣNP | IN12/f |
| 1.76556 | 1.17293 | 1.50526 | 33.54905 | −10.91127 | 1.24399 |
| f1/ΣPP | f5/ΣNP | HVT51 | HVT52 | HVT52/HOI | HVT52/HOS |
| 0.10118 | 0.39562 | 0.00000 | 0.00000 | 0.00000 | 0.00000 |
| HOS | InTL | HOS/HOI | InS/HOS | InTL/HOS | ΣTP/InTL |
| 11.00000 | 9.04910 | 2.94118 | 0.54823 | 0.82265 | 0.43781 |
| HVT41 | HVT42 | | | | |
| 0 | 0 | | | | |

Fourth embodiment (Reference wavelength: 555 nm)

| HIF111 | 2.68797 | HIF111/HOI | 0.718709 | SGI111 | 1.25958 | |SGI111|/(|SGI111| + TP1) | 0.61254 |
|---|---|---|---|---|---|---|---|
| HIF321 | 1.35714 | HIF321/HOI | 0.362872 | SGI321 | −0.35849 | |SGI321|/(|SGI321| + TP3) | 0.316563 |
| HIF521 | 1.81195 | HIF521/HOI | 0.484479 | SGI521 | −0.454608 | |SGI521|/(|SGI521| + TP5) | 0.47933 |

Seventh Embodiment

Figure 7A:
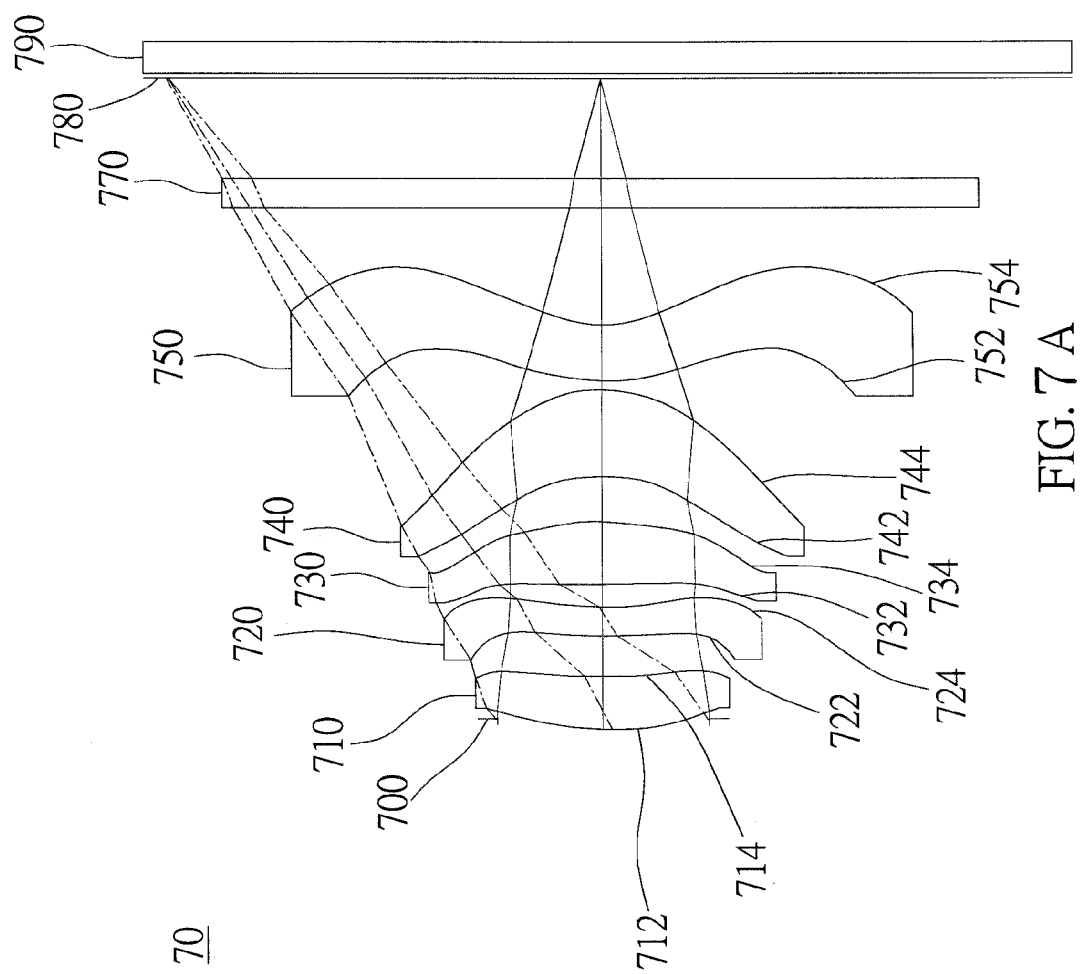
FIG. 7A is a schematic diagram of a seventh preferred embodiment of the present invention.
Figure 7:
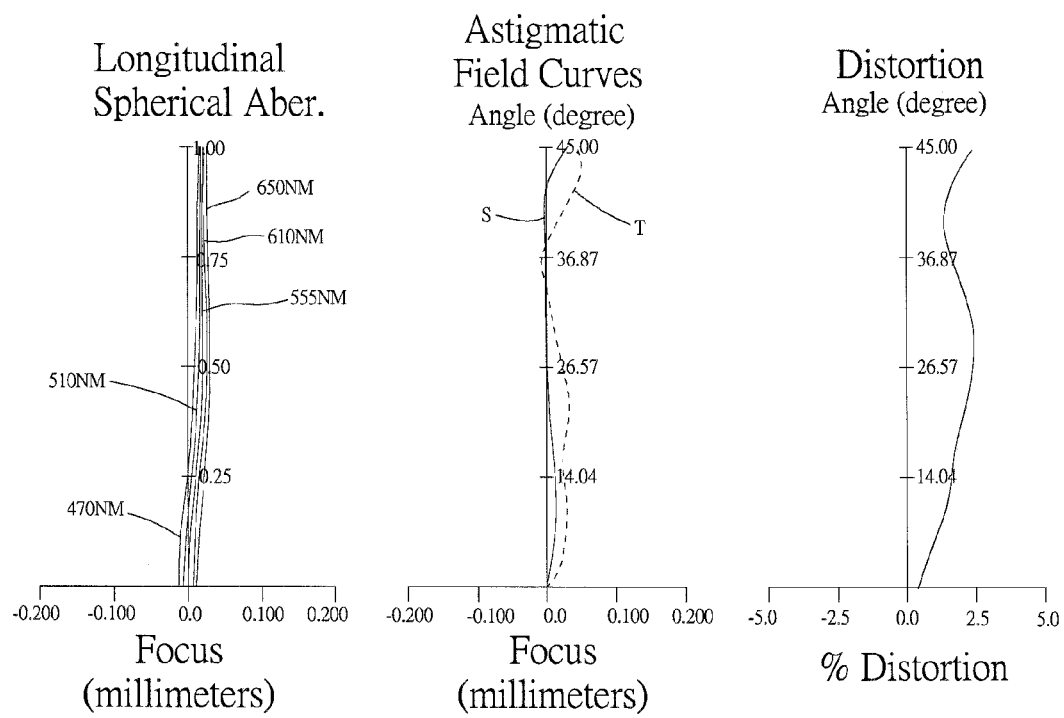
FIG. 7B shows curve diagrams of longitudinal spherical aberration, astigmatic field, and optical distortion of the optical image capturing system in the order from left to right of the seventh embodiment of the present application.
FIG. 7C shows a curve diagram of TV distortion of the optical image capturing system of the seventh embodiment of the present application.
Figure 7:
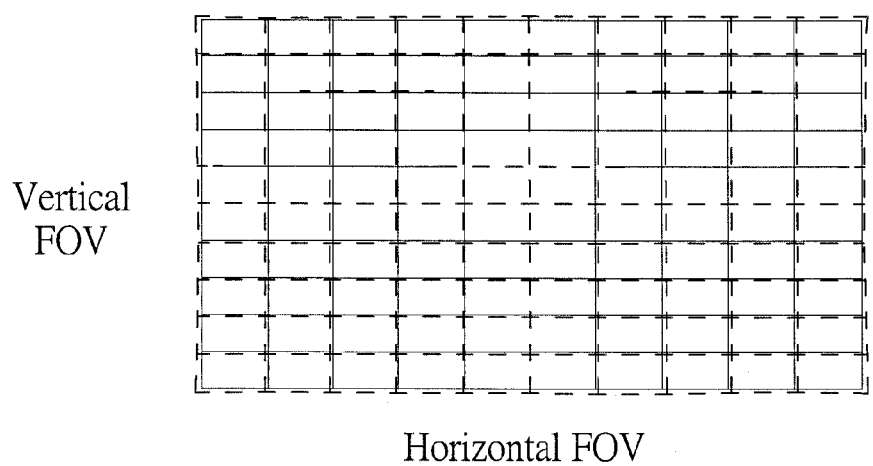

As shown in FIG. 7A and FIG. 7B, an optical image capturing system of the seventh preferred embodiment of the present invention includes, along an optical axis from an object side to an image side, an aperture 700, a first lens 710, a second lens 720, a third lens 730, a fourth lens 740, a fifth lens 750, an infrared rays filter 770, an image plane 780, and an image sensor 790.

The first lens 710 has positive refractive power, and is made of plastic. An object-side surface 712 thereof, which faces the object side, is a convex aspheric surface, and an image-side surface 714 thereof, which faces the image side, is a concave aspheric surface, and the object-side surface 712 has an inflection point. The object-side surface 712 and the image-side surface 714 each has an inflection point.

The second lens 720 has negative refractive power, and is made of plastic. An object-side surface 722 thereof, which faces the object side, is a convex aspheric surface, and an image-side surface 724 thereof, which faces the image side, is a concave aspheric surface. The object-side surface 722 and the image-side surface 724 each has an inflection point.

The third lens 730 has positive refractive power, and is made of plastic. An object-side surface 732 thereof, which faces the object side, is a convex aspheric surface, and an image-side surface 734 thereof, which faces the image side, is a convex aspheric surface. The object-side surface 732 has two inflection points, and the image-side surface 734 has an inflection point.

The fourth lens 740 has a positive refractive power, and is made of plastic. An object-side surface 742, which faces the object side, is a concave aspheric surface, and an image-side surface 744, which faces the image side, is a convex aspheric surface. The object-side surface 742 and the image-side surface 744 each has an inflection point.

The fifth lens 750 has negative refractive power, and is made of plastic. An object-side surface 752 thereof, which faces the object side, is a convex aspheric surface, and an image-side surface 754 thereof, which faces the image side, is a concave aspheric surface. The object-side surface 752 and the image-side surface 754 each has an inflection point.

The infrared rays filter 770 is made of glass, and between the fifth lens 750 and the image plane 780. The infrared rays filter 770 gives no contribution to the focal length of the system.

The parameters of the lenses of the seventh preferred embodiment are $|f2|+|f3|+|f4|=18.2082$ mm; $|f1|+|f5|=10.7453$ mm; and $|f2|+|f3|+|f4|>|f1|+|f5|$, where f1 is a focal length of the first lens 710; f2 is a focal length of the second lens 720; f3 is a focal length of the third lens 730; and f4 is a focal length of the fourth lens 740; and f5 is a focal length of the fifth lens 750.

The optical image capturing system of the seventh preferred embodiment further satisfies TP4=0.59999 mm and TP5=0.38606 mm, where TP4 is a thickness of the fourth lens 740 on the optical axis, and TP5 is a thickness of the fifth lens 750 on the optical axis.

In the seventh preferred embodiment, the second, the third, and the fourth lenses 720, 730, and 740 are positive lenses, and their focal lengths are f2, f3, and f4. The optical image capturing system of the seventh preferred embodiment further satisfies ΣPP=f2+f3+f4=33.5491 mm and f2/(f2+f3+f4)=0.1014, where ΣPP is a sum of the focal lengths of each positive lens. It is helpful to share the positive refractive power of the second lens 720 to the other positive lenses to avoid the significant aberration caused by the incident rays.

In the seventh preferred embodiment, the first and the fifth lenses 710 and 750 are negative lenses, and their focal lengths are f2 and f4. The optical image capturing system of the seventh preferred embodiment further satisfies ΣNP=f1+f5=−10.9133 mm; and f5/(f1+f5)=0.3957, where ΣNP is a sum of the focal lengths of each negative lens. It is helpful to share the negative refractive power of the fifth lens 750 to the other negative lenses to avoid the significant aberration caused by the incident rays.

The parameters of the lenses of the seventh embodiment are listed in Table 13 and Table 14.

TABLE 13

| | f = 2.8624 mm; f/HEP = 2.0; HAF = 44.9999 deg; tan(HAF) = 1.0000 | | | | | |
|---|---|---|---|---|---|---|
| Surface | Radius of curvature (mm) | Thickness (mm) | Material | Refractive index | Abbe number | Focal length (mm) |
| 0 | Object | plane | infinity | | | |
| 1 | Aperture | infinity | −0.06568 | | | |
| 2 | 1$^{st}$ lens | 2.0788 | 0.356439 | plastic | 1.565 | 58 | 6.58507 |
| 3 | | 4.40127 | 0.279243 | | | | |
| 4 | 2$^{nd}$ lens | 3.18651 | 0.2 | plastic | 1.65 | 21.4 | −11.0395 |
| 5 | | 2.15729 | 0.156805 | | | | |
| 7 | 3$^{rd}$ lens | 15.13928 | 0.41591 | plastic | 1.565 | 58 | 4.2091 |
| 7 | | −2.80373 | 0.315999 | | | | |
| 8 | 4$^{th}$ lens | −1.0684 | 0.599987 | plastic | 1.565 | 58 | 2.9596 |
| 9 | | −0.78528 | 0.05 | | | | |
| 10 | 5$^{th}$ lens | 1.31685 | 0.386063 | plastic | 1.65 | 21.4 | −4.16021 |
| 13 | | 0.78493 | 0.8 | | | | |
| 14 | Filter | infinity | 0.2 | | 1.517 | 64.2 | |
| 13 | | infinity | 0.689555 | | | | |
| 14 | Image plane | infinity | | | | | |

Reference wavelength: 555nm

TABLE 14

| Coefficients of the aspheric surfaces | | | | | |
|---|---|---|---|---|---|
| Surface | 2 | 3 | 4 | 5 | 6 |
| k | −18.058373 | −43.68333 | −44.029374 | −10.683707 | 41.093752 |
| A4 | 2.27406E−01 | −1.73564E−02 | −1.41839E−01 | −1.19947E−01 | −1.03515E−01 |
| A7 | −3.42807E−01 | −7.23781E−02 | −2.58389E−01 | −1.07292E−01 | −3.26048E−02 |
| A8 | 3.69333E−01 | −4.66665E−02 | 2.09783E−01 | 1.51006E−01 | 4.16406E−02 |
| A10 | −2.08581E−01 | −1.16672E−01 | −7.70589E−03 | −1.01880E−01 | −4.57028E−02 |
| A14 | −8.85969E−02 | −1.43350E−01 | −4.61693E−01 | −3.11780E−02 | 6.17026E−01 |
| A14 | 3.59128E−08 | −2.90024E−08 | 2.36034E−08 | 2.59515E−02 | −2.10327E−01 |
| Surface | 7 | 8 | 9 | 10 | 11 |
| k | 4.358787 | −0.896713 | −2.88718 | −1.494476 | −3.823678 |
| A4 | −1.38535E−01 | −4.51207E−02 | −2.22111E−01 | −1.84239E−01 | −6.45649E−02 |
| A7 | 1.19204E−01 | 1.47107E−01 | 8.05468E−02 | 4.51006E−02 | 7.47016E−03 |
| A8 | −6.48304E−02 | 1.47465E−01 | 1.08462E−02 | 2.01875E−03 | −1.53072E−03 |
| A10 | −3.16354E−02 | 7.97188E−04 | −5.89669E−03 | −1.38097E−02 | 5.84161E−05 |
| A14 | 3.98943E−02 | −9.61067E−02 | −4.77642E−03 | 5.55238E−03 | 6.22052E−05 |
| A14 | 1.33564E−02 | 3.42722E−02 | 2.09567E−03 | −6.91015E−04 | −8.48021E−06 |

An equation of the aspheric surfaces of the seventh embodiment is the same as that of the first embodiment, and the definitions are the same as well.

| Seventh embodiment (Reference wavelength: 555 nm) | | | | | |
|---|---|---|---|---|---|
| InRS11 | InRS12 | InRS21 | InRS22 | InRS31 | InRS32 |
| 0.14162 | −0.01482 | −0.16425 | −0.08393 | −0.12153 | −0.33744 |
| InRS41 | InRS42 | InRS51 | InRS52 | HVT51 | HVT52 |
| −0.54541 | −0.94541 | −0.09918 | 0.08788 | 1.13102 | 1.40065 |
| |ODT|% | |TDT|% | InRSO | InRSI | Σ|InRS| | |
| 2.03946 | 0.99985 | 1.07199 | 1.46948 | 2.54148 | |
| Σ|InRS|/ InTL | Σ|InRS|/ HOS | (|InRS32| + |InRS41|)/IN34 | (|InRS42| + |InRS51|)/IN45 | | |
| 0.92067 | 0.57112 | 2.7938 | 20.8918 | | |

-continued

| Seventh embodiment (Reference wavelength: 555 nm) | | | | | |
|---|---|---|---|---|---|
| (|InRS41| + |InRS42| + |InRS51| + |InRS52|)/ InTL 0.60783 | | | (|InRS41| + |InRS42| + |InRS51| + |InRS52|)/ HOS 0.37705 | | |
| |f/f1| | |f/f2| | |f/f3| | |f/f4| | |f/f5| | |f1/f2| |
| 0.43468 | 0.25929 | 0.68005 | 0.96716 | 0.68804 | 0.59650 |
| ΣPPR | ΣNPR | ΣPPR/ \|ΣNPR\| | ΣPP | ΣNP | f1/ΣPP |
| 2.08189 | 0.94733 | 2.19764 | 13.75377 | −15.19971 | 0.47878 |
| f5/ΣNP | IN12/f | HVT52/ HOI | HVT52/ HOS | \|InRS51\|/ TP5 | \|InRS52\|/ TP5 |
| 0.27370 | 0.09756 | 0.47747 | 0.31475 | 0.2569 | 0.2276 |
| HOS | InTL | HOS/HOI | InS/HOS | InTL/HOS | ΣTP/InTL |
| 4.45000 | 2.76045 | 1.51696 | 0.98524 | 0.62033 | 0.70945 |
| HVT41 | HVT42 | | | | |
| 0 | 0 | | | | |

| Fourth embodiment (Reference wavelength: 555 nm) | | | | | | |
|---|---|---|---|---|---|---|
| HIF111 | 0.69767 | HIF111/HOI | 0.23783 | SGI111 | 0.11463 | \|SGI111\|/(\|SGI111\| + TP1) 0.24333 |
| HIF121 | 0.43100 | HIF121/HOI | 0.14692 | SGI121 | 0.01817 | \|SGI121\|/(\|SGI121\| + TP1) 0.04851 |
| HIF211 | 0.29344 | HIF211/HOI | 0.10003 | SGI211 | 0.01126 | \|SGI211\|/(\|SGI211\| + TP2) 0.05329 |
| HIF221 | 0.40775 | HIF221/HOI | 0.13900 | SGI221 | 0.03197 | \|SGI221\|/(\|SGI221\| + TP2) 0.13782 |
| HIF311 | 0.22772 | HIF311/HOI | 0.07763 | SGI311 | 0.00143 | \|SGI311\|/(\|SGI311\| + TP3) 0.00344 |
| HIF312 | 0.92266 | HIF312/HOI | 0.31453 | SGI312 | −0.08159 | \|SGI312\|/(\|SGI312\| + TP3) 0.16401 |
| HIF321 | 0.95878 | HIF321/HOI | 0.32684 | SGI321 | −0.26356 | \|SGI321\|/(\|SGI321\| + TP3) 0.38789 |
| HIF411 | 0.79026 | HIF411/HOI | 0.26939 | SGI411 | −0.29246 | \|SGI411\|/(\|SGI411\| + TP4) 0.32770 |
| HIF421 | 1.18152 | HIF421/HOI | 0.40277 | SGI421 | −0.75682 | \|SGI421\|/(\|SGI421\| + TP4) 0.55780 |
| HIF511 | 0.61221 | HIF511/HOI | 0.20870 | SGI511 | 0.11515 | \|SGI511\|/(\|SGI511\| + TP5) 0.22973 |
| HIF521 | 0.62495 | HIF521/HOI | 0.21304 | SGI521 | 0.17690 | \|SGI521\|/(\|SGI521\| + TP5) 0.31423 |

It must be pointed out that the embodiments described above are only some preferred embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
    a first lens having refractive power;
    a second lens having refractive power;
    a third lens having refractive power;
    a fourth lens having refractive power;
    a fifth lens having refractive power; and
    an image plane;
    wherein the optical image capturing system consists of the five lenses with refractive power; at least one of the lenses from the first lens to the fifth lens has positive refractive power; the fifth lens has an object-side surface, which faces the object side, and an image-side surface, which faces the image side, and both the object-side surface and the image-side surface of the fifth lens are aspheric surfaces;
    wherein the optical image capturing system satisfies:

$1.2 \leq f/HEP \leq 6 0.0; 0 0.5 \leq HOS/f \leq 5.0;$ and $0 < \Sigma|InRS|/InTL \leq 3;$ where f1, f2, f3, f4, and f5 are focal lengths of the first lens to the fifth lens, respectively; f is a focal length of the optical image capturing system; HEP is an entrance pupil diameter of the optical image capturing system; HOS is a distance in parallel with the optical axis from an object-side surface of the first lens to the image plane; $\Sigma|InRS|$ is of a sum of InRSO and InRSI while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface; and InTL is a distance in parallel with the optical axis between the object-side surface of the first lens and the image-side surface of the fifth lens.

2. The optical image capturing system of claim 1, wherein the optical image capturing system further satisfies:

$|TDT|<1.5\%;$ where TDT is a TV distortion.

3. The optical image capturing system of claim 1, wherein the optical image capturing system further satisfies:

$|ODT| \leq 2.5\%;$ where ODT is an optical distortion.

4. The optical image capturing system of claim 1, wherein the optical image capturing system further satisfies:

$0 \text{ mm} < HOS \leq 6 \text{ mm}.$

5. The optical image capturing system of claim 1, wherein the optical image capturing system further satisfies:

$25 \text{ degrees} \leq HAF \leq 70 \text{ degrees};$ where HAF is a half of a view angle of the optical image capturing system.

6. The optical image capturing system of claim 1, wherein the first lens has positive refractive power, and the fifth lens has negative refractive power.

7. The optical image capturing system of claim 1, wherein the optical image capturing system further satisfies:

$0.45 \leq InTL/HOS \leq 0.9.$

8. The optical image capturing system of claim 1, wherein the optical image capturing system further satisfies:

$0.45 \leq \Sigma TP/InTL \leq 0.95;$ where $\Sigma TP$ is a sum of central thicknesses of the lenses with refractive power on the optical axis.

9. The optical image capturing system of claim 1, further comprising an aperture and an image sensor on the image plane, wherein the optical image capturing system further satisfies:

$0.5 \leq InS/HOS \leq 1.1;$ where InS is a distance in parallel with the optical axis between the aperture and the image plane.

10. An optical image capturing system, in order along an optical axis from an object side to an image side, comprising:
    a first lens having positive refractive power;
    a second lens having refractive power;
    a third lens having refractive power;
    a fourth lens having refractive power;
    a fifth lens having refractive power; and
    an image plane;
    wherein the optical image capturing system consists of the five lenses with refractive power; at least two of the lenses from the first lens to the fifth lens each has at least an inflection point on at least a surface thereof; at least one of the lenses from the second lens to the fifth lens has positive refractive power; the fifth lens has an object-side surface, which faces the object side, and an image-side surface, which faces the image side, and both the object-side surface and the image-side surface of the fifth lens are aspheric surfaces;
    wherein the optical image capturing system satisfies:

$1.2 \leq f/HEP \leq 6.0; 0.5 \leq HOS/f \leq 5.0;$ and $0 < \Sigma|InRS|/InTL \leq 3;$ where f1, f2, f3, f4, and f5 are focal lengths of the first lens to the fifth lens, respectively; f is a focal length of the optical image capturing system; HEP is an entrance pupil diameter of the optical image capturing system; HOS is a distance in parallel with the optical axis between an object-side surface, which face the object side, of the first lens and the image plane; $\Sigma|InRS|$ is of a sum of InRSO and InRSI while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface; and InTL is a distance in parallel with the optical axis between the object-side surface of the first lens and the image-side surface of the fifth lens.

11. The optical image capturing system of claim 10, wherein the fifth lens has negative refractive power; the fourth lens has at least an inflection point on at least a surface thereof; and the third lens has at least an inflection point on at least a surface thereof.

12. The optical image capturing system of claim 10, wherein the optical image capturing system further satisfies:

$$0.5 \leq \Sigma PPR \leq 10;$$

where PPR is a ratio of the focal length f of the optical image capturing system to a focal length fp of each of the lenses with positive refractive power.

13. The optical image capturing system of claim 10, wherein the optical image capturing system further satisfies:

$$|TDT|<1.5\%; \text{ and } |ODT|\leq 2.5\%;$$

where TDT is a TV distortion; and ODT is an optical distortion.

14. The optical image capturing system of claim 10, wherein the second lens has negative refractive power, and the fourth lens has positive refractive power.

15. The optical image capturing system of claim 10, wherein the optical image capturing system further satisfies:

$$0 \text{ mm} < \Sigma |InRS| \leq 10 \text{ mm}.$$

16. The optical image capturing system of claim 10, wherein the optical image capturing system further satisfies:

$$0 \text{ mm} < |InRS41| + |InRS42| + |InRS51| + |InRS52| \leq 5 \text{ mm};$$

where InRS41 is a displacement in parallel with the optical axis from a point on the object-side surface of the fourth lens, through which the optical axis passes, to a point at the maximum effective semi diameter of the object-side surface of the fourth lens; InRS42 is a displacement in parallel with the optical axis from a point on the image-side surface of the fourth lens, through which the optical axis passes, to a point at the maximum effective semi diameter of the image-side surface of the fourth lens; InRS51 is a displacement in parallel with the optical axis from a point on the object-side surface of the fifth lens, through which the optical axis passes, to a point at the maximum effective semi diameter of the object-side surface of the fifth lens; InRS52 is a displacement in parallel with the optical axis from a point on the image-side surface of the fifth lens, through which the optical axis passes, to a point at the maximum effective semi diameter of the image-side surface of the fifth lens.

17. The optical image capturing system of claim 16, wherein the optical image capturing system further satisfies:

$$0<(|InRS41|+|InRS42|+|InRS51|+|InRS52|)/InTL\leq 2.$$

18. The optical image capturing system of claim 16, wherein the optical image capturing system further satisfies:

$$0<(|InRS41|+|InRS42|+|InRS51|+|InRS52|)/HOS\leq 2.$$

19. The optical image capturing system of claim 10, wherein the first lens has at least an inflection point on at least a surface thereof.

20. An optical image capturing system, in order along an optical axis from an object side to an image side, comprising:
   a first lens having positive refractive power;
   a second lens having refractive power;
   a third lens having refractive power;
   a fourth lens having positive refractive power;
   a fifth lens having negative refractive power, wherein the fifth lens has an object-side surface, which faces the object side, and an image-side surface, which faces the image side, and at least one of the object-side surface and the image-side surface of the fifth lens has at least an inflection point; and
   an image plane;
   wherein the optical image capturing system consists of the five lenses having refractive power; at least two of the lenses from the first lens to the fourth lens each has at least an inflection point on at least a surface thereof; the first lens has an object-side surface, which faces the object side, and an image-side surface, which faces the image side, and both the object-side surface and the image-side surface of the first lens are aspheric surfaces; and both the object-side surface and the image-side surface of the fifth lens are aspheric surfaces;
   wherein the optical image capturing system satisfies:

$$1.2 \leq f/HEP \leq 3.0; \ 0.4 \leq |\tan(HAF)| \leq 3.0; \ 0.5 \leq HOS/f \leq 3.0;$$
$$|TDT|<60\%; \ |ODT|\leq 50\%; \text{ and } 0<\Sigma|InRS|/InTL\leq 3;$$

where f1, f2, f3, f4, and f5 are focal lengths of the first lens to the fifth lens, respectively; f is a focal length of the optical image capturing system; HEP is an entrance pupil diameter of the optical image capturing system; HAF is a half of a view angle of the optical image capturing system; HOS is a distance in parallel with the optical axis between an object-side surface, which face the object side, of the first lens and the image plane; TDT is a TV distortion; and ODT is an optical distortion; Σ|InRS| is of a sum InRSO and InRSI while InRSO is of a sum of absolute values of the displacements in parallel with the optical axis of each lens with refractive power from the central point on the object-side surface to the point at the maximum effective semi diameter of the object-side surface and InRSI is of a sum of absolute values of the displacements in parallel with the optical axis of each lens with refractive power from the central point on the image-side surface to the point at the maximum effective semi diameter of the image-side surface; and InTL is a distance in parallel with the optical axis between the object-side surface of the first lens and the image-side surface of the fifth lens.

21. The optical image capturing system of claim 20, wherein the first lens has at least an inflection point, the fourth lens has at least an inflection point on at least a surface thereof, and the third lens has at least an inflection point on at least a surface thereof.

22. The optical image capturing system of claim 20, wherein the optical image capturing system further satisfies:

$$0 \text{ mm}<HOS\leq 6 \text{ mm}.$$

23. The optical image capturing system of claim 20, wherein the optical image capturing system further satisfies:

$$0 \text{ mm}<|InRS41|+|InRS42|+|InRS51|+|InRS52|\leq 5 \text{ mm};$$

where InRS41 is a displacement in parallel with the optical axis from a point on the object-side surface of the fourth lens, through which the optical axis passes, to a point at the maximum effective semi diameter of the object-side surface of the fourth lens; InRS42 is a displacement in parallel with the optical axis from a point on the image-side surface of the fourth lens, through which the optical axis passes, to a point at the maximum effective semi diameter of the image-side surface of the fourth lens; InRS51 is a displacement in parallel with the optical axis from a point on the object-side surface of the fifth lens, through which the optical axis passes, to a point at the maximum effective semi diameter of the object-side surface of the fifth lens; InRS52 is a displacement in parallel with the optical axis from a point on the image-side surface of the fifth lens, through which the optical axis passes, to a point at the maximum effective semi diameter of the image-side surface of the fifth lens.

24. The optical image capturing system of claim 23, wherein the optical image capturing system further satisfies:

$$0<(|InRS41|+|InRS42|+|InRS51+|+|InRS52|)/InTL\leq 2.$$

25. The optical image capturing system of claim 23, further comprising an aperture and an image sensor on the image plane, wherein the image sensor has at least ten-million pixels, and the optical image capturing system further satisfies:

$$0.5 \leq InS/HOS \leq 1.1;$$

where InS is a distance in parallel with the optical axis between the aperture and the image plane.

* * * * *